(12) United States Patent
Yuan et al.

(10) Patent No.: US 10,796,866 B2
(45) Date of Patent: Oct. 6, 2020

(54) DIRECT CURRENT CIRCUIT BREAKER

(71) Applicant: HUAZHONG UNIVERSITY OF SCIENCE AND TECHNOLOGY, Wuhan (CN)

(72) Inventors: Zhao Yuan, Wuhan (CN); Junjia He, Wuhan (CN); Yuan Pan, Wuhan (CN); Hui Xu, Wuhan (CN); Wenting Zhao, Wuhan (CN); Xiaogen Yin, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 530 days.

(21) Appl. No.: 15/703,959

(22) Filed: Sep. 13, 2017

(65) Prior Publication Data

US 2018/0005783 A1  Jan. 4, 2018

Related U.S. Application Data

(63) Continuation-in-part of application No. PCT/CN2016/102894, filed on Oct. 21, 2016.

(30) Foreign Application Priority Data

Nov. 14, 2015  (CN) .......................... 2015 1 0777642

(51) Int. Cl.
*H01H 33/59*  (2006.01)
*H02H 3/38*  (2006.01)
(Continued)

(52) U.S. Cl.
CPC .......... *H01H 33/596* (2013.01); *H02H 3/087* (2013.01); *H02H 3/38* (2013.01);
(Continued)

(58) Field of Classification Search
CPC ...... H01H 33/596; H01H 9/542; H02H 3/021; H02H 3/087; H02H 3/38; H02H 9/02
See application file for complete search history.

(56) References Cited

U.S. PATENT DOCUMENTS

| 4,740,858 A | * | 4/1988 | Yamaguchi | .......... | H01H 33/596 |
| | | | | | 361/3 |
| 5,650,901 A | * | 7/1997 | Yamamoto | ............. | H01H 9/542 |
| | | | | | 361/100 |
| 10,096,989 B2 | * | 10/2018 | Lee | .......................... | H01H 9/54 |

(Continued)

FOREIGN PATENT DOCUMENTS

GB   191303882 A   2/1914

*Primary Examiner* — Jared Fureman
*Assistant Examiner* — Nicolas Bellido
(74) *Attorney, Agent, or Firm* — Matthias Scholl P.C.; Matthias Scholl

(57) ABSTRACT

A direct current circuit breaker, including: n in number circuit breaker modules connected in series, one energy-absorbing and voltage-limiting module connected in parallel to the n in number circuit breaker modules, and a trigger module. The n in number circuit breaker modules each includes a mechanical switch and a commutation branch circuit which are connected in parallel; each commutation branch circuit includes a charging commutation module and a commutation capacitor which are connected in series; the charging commutation module is configured to charge up the commutation capacitor and produce reverse current to cut off the mechanical switch; the one energy-absorbing and voltage-limiting module is configured to absorb energy stored in inductive elements of power systems after a fault current is cut off, so as to limit voltage and protect the mechanical switch, and n is a positive integer greater than or equal to 1.

20 Claims, 17 Drawing Sheets

(51) Int. Cl.
   *H02H 9/02*   (2006.01)
   *H02H 3/087*  (2006.01)
   *H02H 3/02*       (2006.01)
   *H01H 9/54*       (2006.01)

(52) U.S. Cl.
   CPC ............... *H02H 9/02* (2013.01); *H01H 9/542* (2013.01); *H02H 3/021* (2013.01)

(56) References Cited

U.S. PATENT DOCUMENTS

| | | | | |
|---|---|---|---|---|
| 2011/0175460 A1* | 7/2011 | Astrom | ................ | H01H 33/596 307/112 |
| 2012/0234796 A1* | 9/2012 | Juhlin | ................. | H01H 33/596 218/143 |
| 2012/0299393 A1* | 11/2012 | Hafner | .................... | H01H 9/542 307/113 |
| 2013/0038975 A1* | 2/2013 | Hafner | ................. | H01H 33/596 361/93.9 |
| 2013/0278078 A1* | 10/2013 | Ohlsson | ................... | H02H 3/02 307/113 |
| 2014/0005053 A1* | 1/2014 | Schacherer | ............ | H02H 9/023 505/211 |
| 2015/0002977 A1* | 1/2015 | Dupraz | .................. | H01H 71/10 361/115 |
| 2015/0022928 A1* | 1/2015 | Mohaddes Khorassani ................ H02H 1/0007 361/93.7 |
| 2016/0006236 A1* | 1/2016 | Tang | ....................... | H02H 3/38 361/91.5 |
| 2016/0315467 A1* | 10/2016 | Eckel | .................... | H01H 33/596 |

* cited by examiner

DIRECT CURRENT CIRCUIT BREAKER

CROSS-REFERENCE TO RELATED APPLICATIONS

This application is a continuation-in-part of International Patent Application No. PCT/CN2016/102894 with an international filing date of Oct. 21, 2016, designating the United States, now pending, and further claims foreign priority benefits to Chinese Patent Application No. 201510777642.7 filed Nov. 14, 2015. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to the field of high-voltage direct current circuit breakers.

Description of the Related Art

Conventionally, there are two kinds of direct current breakers suitable for use with high voltage: forced zero-crossing mechanical direct current circuit breakers and hybrid direct current circuit breakers.

During operation of the forced zero-crossing mechanical direct current circuit breakers, the reverse high-frequency current produced by a pre-charged capacitor is superimposed on the direct current fault current in the mechanical switches to produce "artificial current zero" to extinguish electric arcs and break direct currents. The charging loop is complex in structure, large, difficult to control, and expensive to produce.

The hybrid direct current circuit breakers require a plurality of IGBTs connected in series and in parallel, so the structure is bulky, expensive, unreliable, and difficult to control.

SUMMARY OF THE INVENTION

In view of the above-described problems, it is one objective of the present disclosure to provide a high-voltage direct current circuit breaker comprising a coupling reactor. In addition to meeting the requirements of direct current systems on high-voltage direct current circuit breakers to act rapidly, cut off heavy currents and bear high voltages, the present disclosure solves the problem that conventional high-voltage direct current circuit breakers cannot break currents in a bidirectional way. When cutting off high-voltage heavy currents, the direct current circuit breaker of the present disclosure involves a small number of trigger modules, greatly lowers the production cost and reduces requirements on charging sources.

To achieve the above objective, in accordance with one embodiment of the present disclosure, there is provided a high-voltage direct current circuit breaker comprises n in number circuit breaker modules in series, an energy-absorbing and voltage-limiting module which is connected to the n in number circuit breaker modules in parallel and a trigger module which is connected to n in number circuit breaker modules in parallel. The circuit breaker module comprises a mechanical switch and a commutation branch circuit which is connected to the mechanical switch in parallel. The commutation branch circuit comprises a charging commutation module and a commutation capacitor which are connected in series in that order. The charging commutation module is configured to charge up the commutation capacitor and produces high-frequency reverse currents to cut off the mechanical switches. The energy-absorbing and voltage-limiting module is configured to absorb the energy stored in inductive elements of power systems after a fault current is cut off to protect the mechanical switch. The trigger module and the charging commutation module are connected in parallel to trigger and turn on the charging commutation module after faults. n is a positive integer which is greater than or equal to 1.c The present disclosure also provides a high-voltage direct current circuit breaker comprises an energy-absorbing and voltage-limiting module, n in number mechanical switches connected in series, a commutation branch circuit which is connected to each mechanical switch in parallel and a trigger module. The commutation branch circuit comprises a charging commutation module and a commutation capacitor which are connected in series in that order. The charging commutation module is configured to charge up the commutation capacitors and produces high-frequency reverse currents to cut off the mechanical switches. The energy-absorbing and voltage-limiting module is configured to absorb the energy stored in inductive elements of power systems after a fault current is cut off to protect the mechanical switch. The trigger module and the charging commutation module are connected in parallel to trigger and turn on the charging commutation module after faults. n is a positive integer which is greater than or equal to 1.

The present disclosure also provides a high-voltage direct current circuit breaker comprises n in number circuit breaker modules connected in series, an energy-absorbing and voltage-limiting module which is connected to every circuit breaker module in parallel and a trigger module which is connected to the n in number circuit breaker modules in parallel. The circuit breaker module comprises a mechanical switch and a commutation branch circuit which are connected to the mechanical switch in parallel. The commutation branch circuit comprises a charging commutation module and a commutation capacitor which are connected in series in that order. The charging commutation module is configured to charge up the commutation capacitor and produces high-frequency reverse currents to cut off the mechanical switches. The energy-absorbing and voltage-limiting module is configured to absorb the energy stored in inductive elements of power systems after a fault current is cut off to protect the mechanical switch. The trigger module and the charging commutation module are connected in parallel to trigger and turn on the charging commutation module after faults. n is a positive integer which is greater than or equal to 1.

The present disclosure also provides a high-voltage direct current circuit breaker comprises n in number mechanical switches connected in series, an energy-absorbing and voltage-limiting module which is connected to the n in number circuit breaker modules in parallel, a commutation branch circuit which is connected to each mechanical switch in parallel and a trigger module. The commutation branch circuit comprises a charging commutation module and a commutation capacitor which are connected in series in that order. The charging commutation module is configured to charge up the commutation capacitors and produces high-frequency reverse currents to cut off the mechanical switches. The energy-absorbing and voltage-limiting module is configured to absorb the energy stored in inductive elements of power systems after a fault current is cut off to protect the mechanical switch. The trigger module and the charging commutation module are connected in parallel to trigger and turn on the charging commutation module after faults. n is a positive integer which is greater than or equal to 1.

Furthermore, the charging commutation module comprises a coupling reactor, a coupling capacitor which is connected to one end of the primary side of the coupling reactor in series and a follow current circuit which is connected to the coupling capacitor in parallel. The secondary side of the coupling reactor is connected to the commutation capacitor in series. The other end of the primary side of the coupling reactor is connected to the trigger module in parallel.

Furthermore, the follow current circuit comprises a resistor and a diode.

Furthermore, the trigger module comprises a thyristor and a diode or a trigger switch which are connected in parallel in that order.

The present disclosure also provides a high-voltage direct current circuit breaker comprises n in number circuit breaker modules connected in series, an energy-absorbing and voltage-limiting module which is connected to the n in number circuit breaker modules in parallel, a forward trigger module and a reverse trigger module. Every circuit breaker module comprises a mechanical switch and a commutation branch circuit which is connected to the mechanical switch in parallel. The commutation branch circuit comprises a forward charging commutation module, a commutation capacitor and a reverse charging commutation module. The forward charging commutation module is configured to produce a reverse current in the commutation branch circuit through the coupling reactor to realize the zero-crossing turn-off of the mechanical switch after a forward fault happens. The reverse charging commutation module is configured to produce a reverse current in the commutation branch circuit through the coupling reactor to realize the zero-crossing turn-off of the mechanical switch after a reverse fault happens. The energy-absorbing and voltage-limiting module is configured to absorb the energy stored in inductive elements of power systems after a fault current is cut off to protect the mechanical switch. The forward trigger module is connected to forward charging commutation modules of the n in number circuit breaker modules in parallel and is configured to turn on the forward charging commutation module when a forward fault happens. The reverse trigger module is connected to reverse charging commutation modules of the n in number circuit breaker modules in parallel and is configured to turn on the reverse charging commutation module when a reverse fault happens. n is a positive integer which is greater than or equal to 1.

The present disclosure also provides a high-voltage direct current circuit breaker comprises an energy-absorbing and voltage-limiting module, n in number mechanical switches connected in series, a commutation branch circuit which is connected to each mechanical switch in parallel, a forward trigger module and a reverse trigger module. The commutation branch circuit comprises a forward charging commutation module, a commutation capacitor and a reverse charging commutation module which are connected in series in that order. The forward charging commutation module is configured to produce a reverse current in the commutation branch circuit through the coupling reactor to realize the zero-crossing turn-off of the mechanical switch after a forward fault happens. The reverse charging commutation module is configured to produce a reverse current in the commutation branch circuit through the coupling reactor to realize the zero-crossing turn-off of the mechanical switch after a reverse fault happens. The energy-absorbing and voltage-limiting module is configured to absorb the energy stored in inductive elements of power systems after a fault current is cut off to protect the mechanical switch. The forward trigger module and the forward charging commutation module are connected in parallel to turn on the forward charging commutation module when a forward fault happens. The reverse trigger module and the reverse charging commutation module are connected in parallel to turn on the reverse charging commutation module after a reverse fault. n is a positive integer which is greater than or equal to 1.

The present disclosure also provides a high-voltage direct current circuit breaker comprises n in number circuit breaker modules connected in series, an energy-absorbing and voltage-limiting module which is connected to every circuit breaker module in parallel, a forward trigger module and a reverse trigger module. Every circuit breaker module comprises a mechanical switch and a commutation branch circuit which is connected to the mechanical switch in parallel. The commutation branch circuit comprises a forward charging commutation module, a commutation capacitor and a reverse charging commutation module which are connected in series in that order. The forward charging commutation module is configured to produce a reverse current in the commutation branch circuit through the coupling reactor to realize the zero-crossing turn-off of the mechanical switch after a forward fault happens. The reverse charging commutation module is configured to produce a reverse current in the commutation branch circuit through the coupling reactor to realize the zero-crossing turn-off of the mechanical switch after a reverse fault happens. The energy-absorbing and voltage-limiting module is configured to absorb the energy stored in inductive elements of power systems after a fault current is cut off to protect the mechanical switch. The forward trigger module is connected to forward charging commutation modules of the n in number circuit breaker modules in parallel and is configured to turn on the forward charging commutation module when a forward fault happens. The reverse trigger module is connected to reverse charging commutation modules of the n in number circuit breaker modules in parallel and is configured to turn on the reverse charging commutation module when a reverse fault happens. n is a positive integer which is greater than or equal to 1.

The present disclosure also provides a high-voltage direct current circuit breaker comprises n in number mechanical switches connected in series, an energy-absorbing and voltage-limiting module which is connected to the n in number mechanical switches, a commutation branch circuit which is connected to each mechanical switch in parallel, a forward trigger module and a reverse trigger module. The commutation branch circuit comprises a forward charging commutation module, a commutation capacitor and a reverse charging commutation module which are connected in series in that order. The forward charging commutation module is configured to produce a reverse current in the commutation branch circuit through the coupling reactor to realize the zero-crossing turn-off of the mechanical switch after a forward fault happens. The reverse charging commutation module is configured to produce a reverse current in the commutation branch circuit through the coupling reactor to realize the zero-crossing turn-off of the mechanical switch after a reverse fault happens. The energy-absorbing and voltage-limiting module is configured to absorb the energy stored in inductive elements of power systems after a fault current is cut off to protect the mechanical switch. The forward trigger module and the forward charging commutation module are connected in parallel to turn on the forward charging commutation module when a forward fault happens. The reverse trigger module and the reverse charging commutation module are connected in parallel to turn on the reverse charging commutation module when a forward fault happens. n is a positive integer which is greater than or equal to 1.

The present disclosure also provides a high-voltage direct current circuit breaker comprises n in number circuit breaker modules connected in series, an energy-absorbing and voltage-limiting module which is connected to the n in number mechanical switches, a forward trigger module and a reverse trigger module. The circuit breaker module comprises a mechanical switch and a commutation branch circuit which is connected to the mechanical switch in parallel. The commutation branch circuit comprises a forward charging commutation module and a commutation capacitor which are connected in series in that order, and a reverse commutation module which is connected to the forward commutation module in a parallel. The forward charging commutation module is configured to produce a reverse current in the commutation branch circuit through the coupling reactor to realize the zero-crossing turn-off of the mechanical switch after a forward fault happens. The reverse charging commutation module is configured to produce a reverse current in the commutation branch circuit through the coupling reactor to realize the zero-crossing turn-off of the mechanical switch after a reverse fault happens. The energy-absorbing and voltage-limiting module is configured to absorb the energy stored in inductive elements of power systems after a fault current is cut off to protect the mechanical switch. The forward trigger module is configured to turn on the forward charging commutation module when a forward fault happens. The reverse trigger module is configured to turn on the reverse charging commutation module when a reverse fault happens. n is a positive integer which is greater than or equal to 1.

The present disclosure also provides a high-voltage direct current circuit breaker comprises an energy-absorbing and voltage-limiting module, n in number mechanical switches, a commutation branch circuit which is connected to any one of the n mechanical switch in parallel, a forward trigger module and a reverse trigger module. The commutation branch circuit comprises a forward charging commutation module and a commutation capacitor which are connected in series, and a reverse commutation module which is connected to the forward commutation module in a parallel. The forward charging commutation module is configured to produce a reverse current in the commutation branch circuit through the coupling reactor to realize the zero-crossing turn-off of the mechanical switch after a forward fault happens. The reverse charging commutation module is configured to produce a reverse current in the commutation branch circuit through the coupling reactor to realize the zero-crossing turn-off of the mechanical switch after a reverse fault happens. The energy-absorbing and voltage-limiting module is configured to absorb the energy stored in inductive elements of power systems after a fault current is cut off to protect the mechanical switch. The forward trigger module is configured to turn on the forward charging commutation module when a forward fault happens. The reverse trigger module is configured to turn on the reverse charging commutation module when a reverse fault happens. n is a positive integer which is greater than or equal to 1.

The present disclosure also provides a high-voltage direct current circuit breaker comprises n in number circuit breaker modules which are connected in a series, an energy-absorbing and voltage-limiting module which is connected to every mechanical switch, a forward trigger module and a reverse trigger module. The circuit breaker module comprises a mechanical switch and a commutation branch circuit which is connected to the mechanical switch in parallel. The commutation branch circuit comprises a forward charging commutation module and a commutation capacitor which are connected in series in that order, and a reverse commutation module which is connected to the forward commutation module in a parallel. The forward charging commutation module is configured to produce a reverse current in the commutation branch circuit through the coupling reactor to realize the zero-crossing turn-off of the mechanical switch after a forward fault happens. The reverse charging commutation module is configured to produce a reverse current in the commutation branch circuit through the coupling reactor to realize the zero-crossing turn-off of the mechanical switch after a reverse fault happens. The energy-absorbing and voltage-limiting module is configured to absorb the energy stored in inductive elements of power systems after a fault current is cut off to protect the mechanical switch. The forward trigger module is configured to turn on the forward charging commutation module when a forward fault happens. The reverse trigger module is configured to turn on the reverse charging commutation module when a reverse fault happens. n is a positive integer which is greater than or equal to 1.

The present disclosure also provides a high-voltage direct current circuit breaker comprises n in number mechanical switches, an energy-absorbing and voltage-limiting module which is connected to the n in number mechanical switches, a commutation branch circuit which is connected to any one of the n mechanical switch in parallel, a forward trigger module and a reverse trigger module. The commutation branch circuit comprises a forward charging commutation module and a commutation capacitor which are connected in series, and a reverse commutation module which is connected to the forward commutation module in a parallel. The forward charging commutation module is configured to produce a reverse current in the commutation branch circuit through the coupling reactor to realize the zero-crossing turn-off of the mechanical switch after a forward fault happens. The reverse charging commutation module is configured to produce a reverse current in the commutation branch circuit through the coupling reactor to realize the zero-crossing turn-off of the mechanical switch after a reverse fault happens. The energy-absorbing and voltage-limiting module is configured to absorb the energy stored in inductive elements of power systems after a fault current is cut off to protect the mechanical switch. The forward trigger module and the forward charging commutation module are connected in parallel to turn on the forward charging commutation module when a forward fault happens. The reverse trigger module and the reverse charging commutation module are connected in parallel to turn on the reverse charging commutation module when a forward fault happens. n is a positive integer which is greater than or equal to 1.

Furthermore, the forward charging commutation module comprises a coupling reactor, a coupling capacitor and a follow current circuit which is connected to the coupling capacitor. The secondary side of the coupling reactor is connected to the commutation capacitor in series. The one end of the primary side of the coupling reactor is grounded through the coupling capacitor. The other end of the primary side of the coupling reactor is connected to the forward trigger module in parallel. The follow current circuit comprises a diode and a resistor which are connected in series in that order. The anode of the diode is connected to the coupling capacitor. The cathode of the diode is connected to the resistor in series.

The forward trigger module comprises a thyristor and a diode or a trigger switch which are connected in parallel in that order.

Furthermore, the reverse charging commutation module comprises a coupling reactor, a coupling capacitor and a follow current circuit which is connected to the coupling capacitor in parallel. The secondary side of the coupling reactor is connected to the commutation capacitor in series. The one end of the primary side of the coupling reactor is grounded through the coupling capacitor. The other end of the primary side of the coupling reactor is connected to the reverse trigger module in parallel. The follow current circuit comprises a diode and a resistor which are connected in series in that order. The anode of the diode is connected to the coupling capacitor. The cathode of the diode is connected to the resistor in series.

The trigger module, the forward trigger module or reverse trigger module comprise a thyristor and a diode which are connected in antiparallel.

The trigger module, the forward trigger module or reverse trigger module are a trigger switch.

The present disclosure provides a high-voltage direct current circuit breaker comprises n circuit breaker module which are connected in series and an energy-absorbing and voltage-limiting module which is connected to the n in number circuit breaker modules in parallel. n is a positive integer which is greater than or equal to 1. The circuit breaker module comprises a mechanical switch and a commutation branch circuit which are connected in parallel. The commutation branch circuit comprises a charging commutation module and a commutation capacitor which are connected in series. The charging commutation module comprises a coupling reactor whose secondary side is connected to the commutation branch circuit, a coupling capacitor which is connected to the primary side of the coupling reactor in series, and a follow current circuit which is connected to the coupling capacitor in parallel. The charging commutation module provides a reverse current for the branch circuit of the circuit breaker to form the current zero through superposition. When a reverse fault happens, the charging commutation module charges the commutation capacitor, and works with the commutation capacitor together to produce a reverse high-frequency oscillating current to provide the current zero for the mechanical switch. The trigger switch is configured to turn on the charging commutation module after fault detection.

In order to guarantee better modularization of high-voltage direct current circuit breakers, the present disclosure provides the second kind of high-voltage direct current circuit breaker comprises n in number circuit breaker modules connected in series, an energy-absorbing and voltage-limiting module which is connected to the n in number circuit breaker modules in parallel, and a trigger switch. n is a positive integer which is greater than or equal to 1. The circuit breaker module comprises a mechanical switch and a commutation branch which are connected in parallel. The commutation branch circuit comprises a forward charging commutation module, a reverse charging commutation module and a commutation capacitor which are connected in series. The forward charging commutation module comprises a coupling reactor whose secondary side is connected to the commutation branch circuit, a coupling capacitor which is connected to the primary side of the coupling reactor in series and a follow current circuit which is connected to the coupling capacitor in parallel. The reverse charging commutation module comprises a coupling reactor whose secondary side is connected to the commutation branch circuit, a coupling capacitor of forward pre-charge which is connected to the coupling reactor in series, and a follow current circuit which is connected to the coupling capacitor in parallel. The follow current circuit comprises a diode and a resistor which are connected in series. The forward charging commutation module is configured to produce a reverse current in the commutation branch circuit through the coupling reactor to realize the zero-crossing turn-off of the circuit breaker when a forward current fault happens. The reverse charging commutation module is configured to produce a reverse current in the commutation branch circuit through the coupling reactor to realize the zero-crossing turn-off of the circuit breaker when a reverse current fault happens. The trigger switch is configured to turn on the charging commutation module after fault detection.

In order to guarantee better modularization of high-voltage direct current circuit breakers, the present disclosure provides the third kind of high-voltage direct current circuit breaker comprises n in number circuit breaker modules connected in series, an energy-absorbing and voltage-limiting module which is connected to the n in number circuit breaker modules in parallel, and a trigger switch. n is a positive integer which is greater than or equal to 1. The circuit breaker module comprises a mechanical switch and a commutation branch circuit which are connected in parallel. The commutation branch circuit comprises a bi-directional charging commutation module and a commutation capacitor which are connected in series. The bi-directional charging commutation module comprises a forward charging commutation module and a reverse charging commutation module which are connected in parallel. The forward charging commutation module comprises a forward coupling reactor whose secondary side is connected to the commutation branch circuit, a coupling capacitor which is connected to the primary side of the forward coupling reactor in series, and a follow current circuit which is connected to the coupling capacitor in series. The reverse charging commutation module comprises a reverse reactor whose secondary side is connected to the commutation branch circuit, a trigger switch and a coupling capacitor of forward pre-charge which are connected to the reverse coupling reactor in series, and a follow current circuit which is connected to the coupling capacitor. The follow current circuit comprises a diode and a resistor which are connected in series. The forward charging commutation module is configured to produce a reverse current to realize the zero-crossing turn-off of the circuit breaker module when a forward current fault happens. The reverse charging commutation module is configured to produce a reverse current in the commutation branch circuit through the coupling reactor when a reverse current fault happens. The trigger switch is configured to turn on the charging commutation module after fault detection.

When the system has a short circuit fault, the working principle is as follows:

When a fault is detected, the line current rises. After certain delay, the mechanical switch is turned off. When the mechanical switch is at an effective open distance, the trigger switch is turned on so the coupling capacitor starts electric discharge. When a forward current fault happens, the coupling capacitor produces a reverse current in the commutation branch circuit through the coupling reactor to realize the zero-crossing turn-off of the circuit breaker module. When a reverse current fault happens, the coupling capacitor charges the commutation capacitor through the coupling reactor. The commutation capacitor and the secondary side of the coupling reactor produce high-frequency oscillation so that the two ends of the mechanical switch realize voltage zero crossing. The mechanical switch extinguishes arc discharge and is turned off. As the current constantly flows into the commutation branch circuit, the end contact voltage of the mechanical switch constantly rises. When the voltage reaches the operation voltage of the energy-absorbing and voltage-limiting module, the current is transferred to the energy-absorbing and voltage-limiting module to consume the energy stored in the system. Therefore, the complete turn-off of fault is realized.

The present disclosure can flexibly meet the requirements of different voltage classes through a multi-module series connection. The present disclosure provides a high-voltage direct current circuit breaker. On the basis of meeting the requirements of direct current systems on high-voltage direct current circuit breakers to act rapidly, cut off heavy currents and bear high voltages, the present disclosure charges the commutation capacitor through the coupling branch circuit and can realize cut-off of heavy currents and bi-directional cut-off of currents. The commutation branch circuit adopts buffer capacitors to replace a great deal of power electronic devices in series. Since the devices are unitary and no voltage-sharing strategy is needed, the present disclosure solves the problem of poor reliability. Meanwhile, when the line voltage class rises and a plurality of charging commutation modules is needed, due to the topological property of the charging commutation modules, the charging commutation modules share a trigger switch. Therefore, the present disclosure reduces the amount of the trigger switches when a plurality of modules is needed and substantially lowers the cost of circuit breakers.

DETAILED DESCRIPTION OF THE EMBODIMENTS

For further illustrating the invention, experiments detailing a high-voltage direct current circuit breaker comprising a coupling reactor are described hereinbelow combined with the drawings. It should be noted that the following examples are intended to describe and not to limit the invention. In addition, all technical features of the embodiments can combine with each other, provided they do not conflict with each other.

Figure 1:
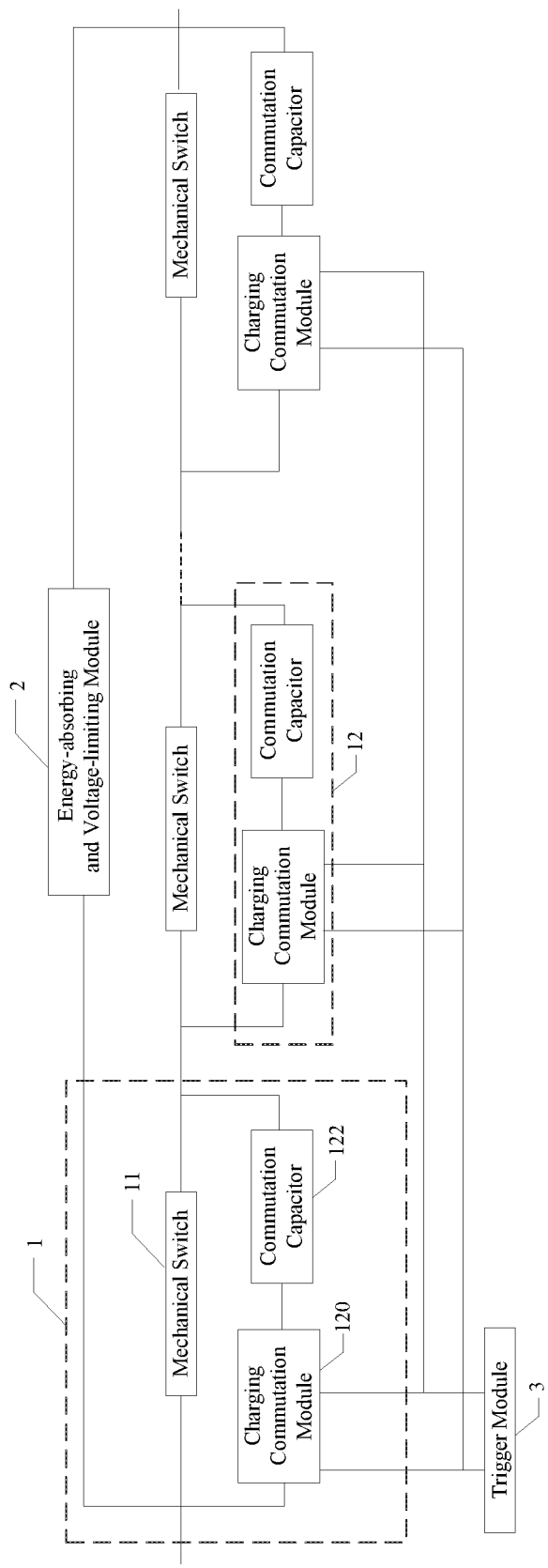
FIG. 1 is a functional block diagram of a high-voltage direct current circuit breaker according to a first embodiment of the present disclosure.

FIG. 1 is a functional block diagram of a high-voltage direct current circuit breaker comprising a coupling reactor according to a first embodiment of the present disclosure. For better illustration, FIG. 1 only shows the parts related to the first embodiment of the present disclosure in detail as follows:

A high-voltage direct current circuit breaker comprising a coupling reactor comprises n in number circuit breaker modules 1 which are connected in series, an energy-absorbing and voltage-limiting module 2 which is connected to every circuit breaker module in parallel, and a trigger module 3 which is connected to the charging commutation module in parallel. n is a positive integer which is greater than or equal to 1. The circuit breaker module 1 comprises a mechanical switch 11 and a commutation branch circuit 12 which are connected in parallel. The commutation branch circuit 12 comprises a charging commutation module 120 and a commutation capacitor 122 which are connected in series. The charging commutation module 120 in the commutation branch circuit 12 is configured to work with the commutation capacitor 122 together to extinguish arc and turn off the circuit breaker module 1 after a fault happens. The commutation capacitor 122 is configured to work with the secondary side of the coupling reactor in the charging commutation module 120 to produce a high-frequency oscillating current to extinguish the arc discharge of the mechanical switch. The trigger module 3 can be a thyristor and a diode which are anti-parallel or a trigger switch and is configured to turn on the charging commutation module 12 when a fault happens. The energy-absorbing and voltage-limiting module 2 can be a zinc oxide lightning arrester and is configured to absorb the energy stored in inductive elements of power system after a fault current is cut off to realize the voltage-limiting protection of the mechanical switch 11.

The high-voltage direct current circuit breaker comprising a coupling reactor provided by the first embodiment of the present disclosure can cut off a heavier current through a multi-module connection. Meanwhile, through the coupling reactor, the primary sides of a plurality of charging commutation modules share a trigger switch, and the single trigger switch triggers a plurality of charging commutation modules at the same time. Therefore, the present disclosure reduces the amount of trigger switches of multi-module circuit breakers greatly, saves costs and also makes control easier. In addition, the application of the charging commutation module provides a bi-directional turn-off function for circuit breakers.

Figure 2:
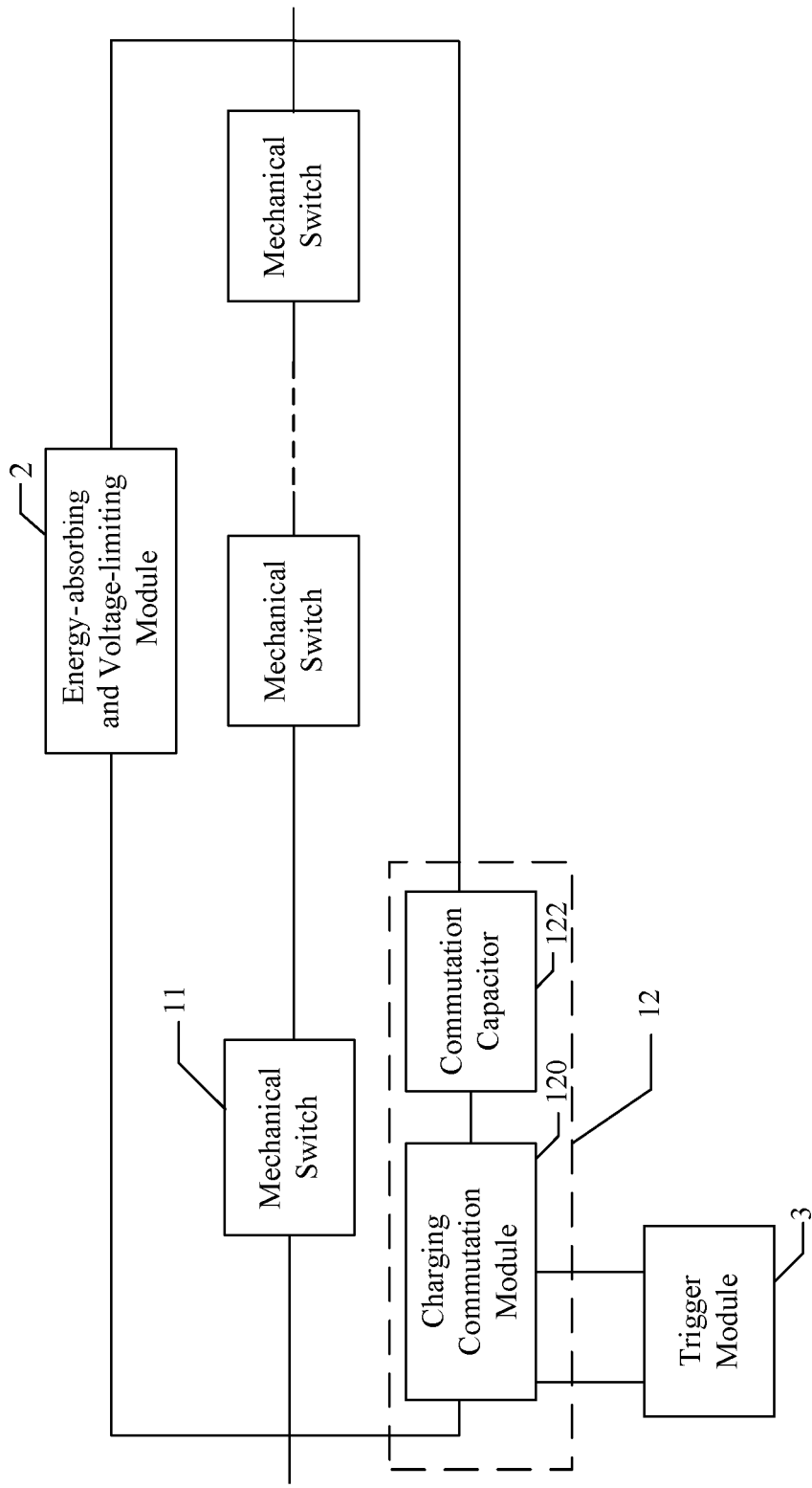
FIG. 2 is a functional block diagram of a high-voltage direct current circuit breaker according to a second embodiment of the present disclosure.

FIG. 2 is a functional block diagram of a high-voltage direct current circuit breaker comprising a coupling reactor according to a second embodiment of the present disclosure. For better illustration, FIG. 2 only shows the parts related to the second embodiment of the present disclosure in detail as follows:

A high-voltage direct current circuit breaker comprising a coupling reactor comprises n in number mechanical switches 11 which are connected in series, an energy-absorbing and voltage-limiting module 2 which is connected to the n in number circuit breaker modules in parallel, a commutation branch circuit 12 which is connected to the n in number mechanical switches 11 in parallel and a trigger module 3. n is a positive integer which is greater than or equal to 1. The commutation branch circuit 12 comprises a charging commutation module 120 and a commutation capacitor 122 which are connected in series in that order. The charging commutation module 120 in the commutation branch circuit 12 is configured to work with the commutation capacitor 122 together to extinguish arc and turn off the mechanical switches 11 after a fault happens. The commutation capacitor 122 is configured to work with the secondary side of the coupling reactor in the charging commutation module 121 to produce a high-frequency oscillating current to extinguish the arc of the mechanical switch. The trigger module 3 is connected to the trigger control terminal of the charging commutation module 120. The trigger module 3 can be a thyristor and a diode which are anti-parallel or a trigger switch and is configured to turn on the charging commutation module 12 when a fault happens. The energy-absorbing and voltage-limiting module 2 can be a zinc oxide lightning arrester and is configured to absorb the energy stored in inductive elements of power system after a fault current is cut off to realize the voltage-limiting protection of the mechanical switches 11 to n1.

As for a high-voltage direct current circuit breaker comprising a coupling reactor provided by the second embodiment of the present disclosure, a plurality of mechanical switches shares a commutation branch circuit. When the voltage is not very high, the second embodiment can reduce the amount of commutation branch circuits and make the circuit structure simpler. In addition, the application of the charging commutation module provides a bi-directional turn-off function for circuit breakers.

Figure 3:
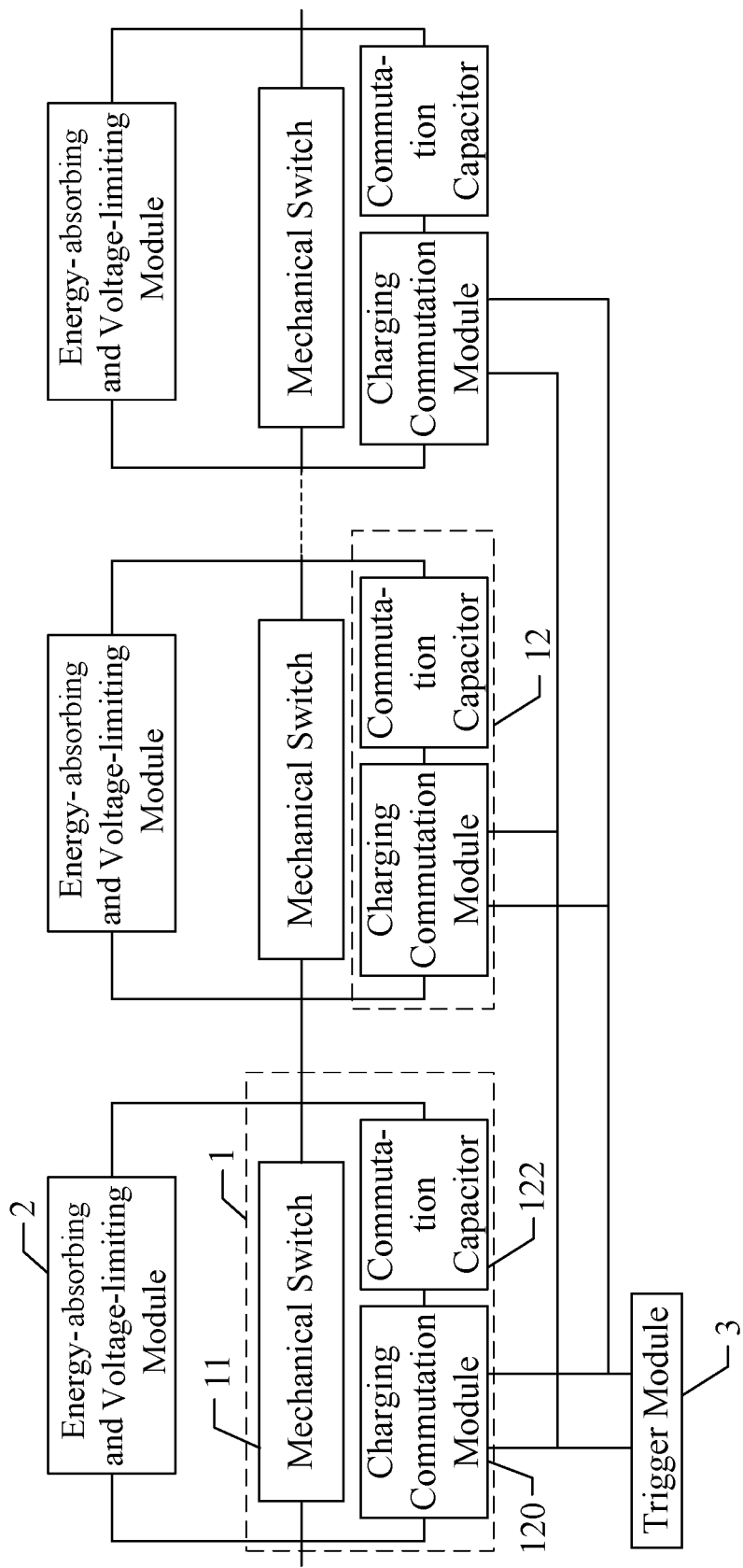
FIG. 3 is a functional block diagram of a high-voltage direct current circuit breaker according to a third embodiment of the present disclosure.

FIG. 3 is a functional block diagram of a high-voltage direct current circuit breaker comprising a coupling reactor according to a third embodiment of the present disclosure. For better illustration, FIG. 3 only shows the parts related to the third embodiment of the present disclosure in detail as follows:

A high-voltage direct current circuit breaker comprising a coupling reactor comprises n in number circuit breaker modules 1 which are connected in series, n energy-absorbing and voltage-limiting modules 2 which are connected to every circuit breaker in parallel, and trigger module 3 which is connected to the charging commutation module in parallel. n is a positive integer which is greater than or equal to 1. The circuit breaker module 1 comprises a mechanical switch 11 and a commutation branch circuit 12 which are connected in parallel. The commutation branch circuit 12 comprises a charging commutation module 120 and a commutation capacitor 122 which are connected in series in that order. The charging commutation module 120 in the commutation branch circuit 12 is configured to work with the commutation capacitor 122 together to extinguish arc and turn off the circuit breaker 11 after a fault happens. The commutation capacitor 122 is configured to work with the secondary side of the coupling reactor in the charging commutation module 120 to produce a high-frequency oscillating current to extinguish the arc of the mechanical switch. The trigger module 3 can be a thyristor and a diode which are anti-parallel or a trigger switch and is configured to turn on the charging commutation module 12 when a fault happens. The energy-absorbing and voltage-limiting module 2 can be a zinc oxide lightning arrester and is configured to absorb the energy stored in inductive elements of power system after a fault current is cut off to realize the voltage-limiting protection of the mechanical switch 11.

A high-voltage direct current circuit breaker comprising a coupling reactor provided by the third embodiment of the present disclosure can cut off a heavier current through a multi-module connection. Meanwhile, through the coupling reactor, the primary sides of a plurality of charging commutation modules share a trigger switch, and the single trigger switch triggers a plurality of charging commutation modules at the same time. Therefore, the present disclosure reduces the amount of trigger switches of multi-module circuit breakers greatly, saves costs and also makes control easier. In addition, the application of the charging commutation module provides a bi-directional turn-off function for circuit breakers.

Figure 4:
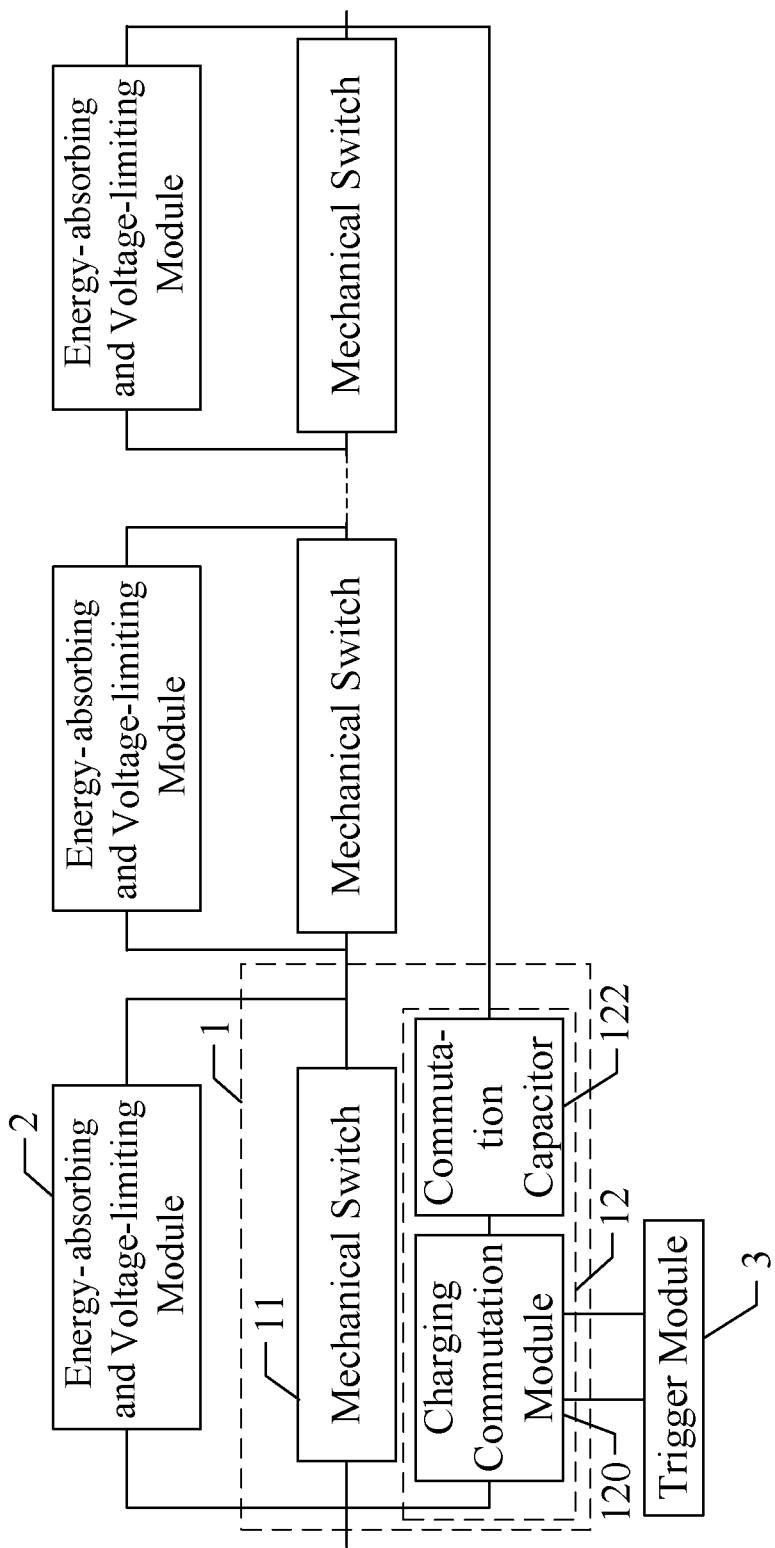
FIG. 4 is a functional block diagram of a high-voltage direct current circuit breaker according to a fourth embodiment of the present disclosure.

FIG. 4 is a functional block diagram of a high-voltage direct current circuit breaker comprising a coupling reactor according to a fourth embodiment of the present disclosure. For better illustration, FIG. 4 only shows the parts related to the fourth embodiment of the present disclosure in detail as follows:

A high-voltage direct current circuit breaker comprising a coupling reactor comprises n in number mechanical switches 11 which are connected in series, an energy-absorbing and voltage-limiting module 2 which is connected to every mechanical switch in parallel, a commutation branch circuit 12 which is connected to the n in number mechanical switches 11 in parallel and a trigger module 3. n is a positive integer which is greater than or equal to 1. The commutation branch circuit 12 comprises a charging commutation module 120 and a commutation capacitor 122 which are connected in series in that order. The charging commutation module 120 in the commutation branch circuit 12 is configured to work with the commutation capacitor 122 together to extinguish arc and turn off the circuit breaker 11 after a fault happens. The commutation capacitor 122 is configured to work with the secondary side of the coupling reactor in the charging commutation module 121 to produce a high-frequency oscillating current to extinguish the arc of the mechanical switch. The trigger module 3 is connected to the charging commutation module 120. The trigger module 3 can be a thyristor and a diode which are anti-parallel or a trigger switch and is configured to turn on the charging commutation module 12 when a fault happens. The energy-absorbing and voltage-limiting module 2 can be a zinc oxide lightning arrester and is configured to absorb the energy stored in inductive elements of power system after a fault current is cut off to realize the voltage-limiting protection of the mechanical switch 11.

As for a high-voltage direct current circuit breaker comprising a coupling reactor provided by the fourth embodiment of the present disclosure, a plurality of mechanical switches shares a commutation branch circuit. When the voltage is not very high, the fourth embodiment can reduce the amount of commutation branch circuits and make the circuit structure simpler. In addition, the application of the charging commutation module provides a bi-directional turn-off function for circuit breakers.

Figure 5:
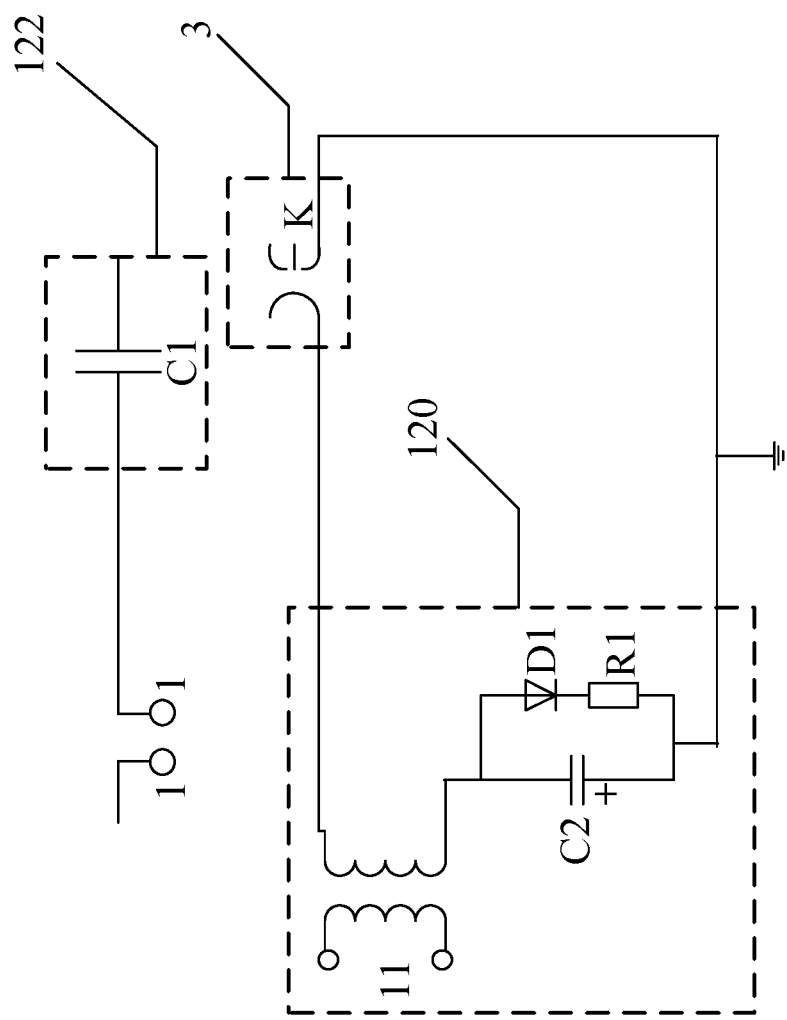
FIG. 5 is a topological structure of a commutation branch circuit and a trigger module of a high-voltage direct current circuit breaker in the fourth embodiment of the present disclosure.

FIG. 5 is a topological structure of the commutation branch circuit and trigger module of a high-voltage direct current circuit breaker comprising a coupling reactor provided by the embodiment of the present disclosure. For better illustration, FIG. 5 only shows the parts related to the embodiment of the present disclosure in detail as follows:

The charging commutation module 120 and the commutation capacitor 122 are connected in series. The charging commutation module 120 comprises a coupling reactor whose secondary side is connected to the commutation capacitor, a coupling capacitor C2 which is connected to the primary side of the coupling reactor in series, and a follow current circuit which is connected to the coupling capacitor C2 in parallel. The follow current circuit comprises a resistor R1 and a diode D1 which are connected in series and is configured to limit the voltage direction of the two ends of the coupling capacitor to prevent the reverse charging of the coupling capacitor. The trigger module 3 is connected to the primary side of the coupling reactor in series.

When a fault happens, the line current rises. After certain delay, the mechanical switch is turned off. When the mechanical switch is at an effective open distance, the trigger switch is turned on so the coupling capacitor starts discharging. When a forward current fault happens, the coupling capacitor produces a reverse current in the commutation branch circuit through the coupling reactor to realize the zero-crossing turn-off of the circuit breaker module. When a reverse current fault happens, the coupling capacitor charges the commutation capacitor through the coupling reactor. The commutation capacitor and the secondary side of the coupling reactor produce high-frequency oscillation so that the two ends of the mechanical switch realize voltage zero crossing. The mechanical switch extinguishes arc and is turned off. As the current constantly flows into the commutation branch circuit, the end voltage of the mechanical switch constantly rises. When the voltage reaches the operation voltage of the energy-absorbing and voltage-limiting module, the current is transferred to the energy-absorbing and voltage-limiting module to consume the energy stored in the system. Therefore, the complete turn-off of fault is realized.

Figure 6:
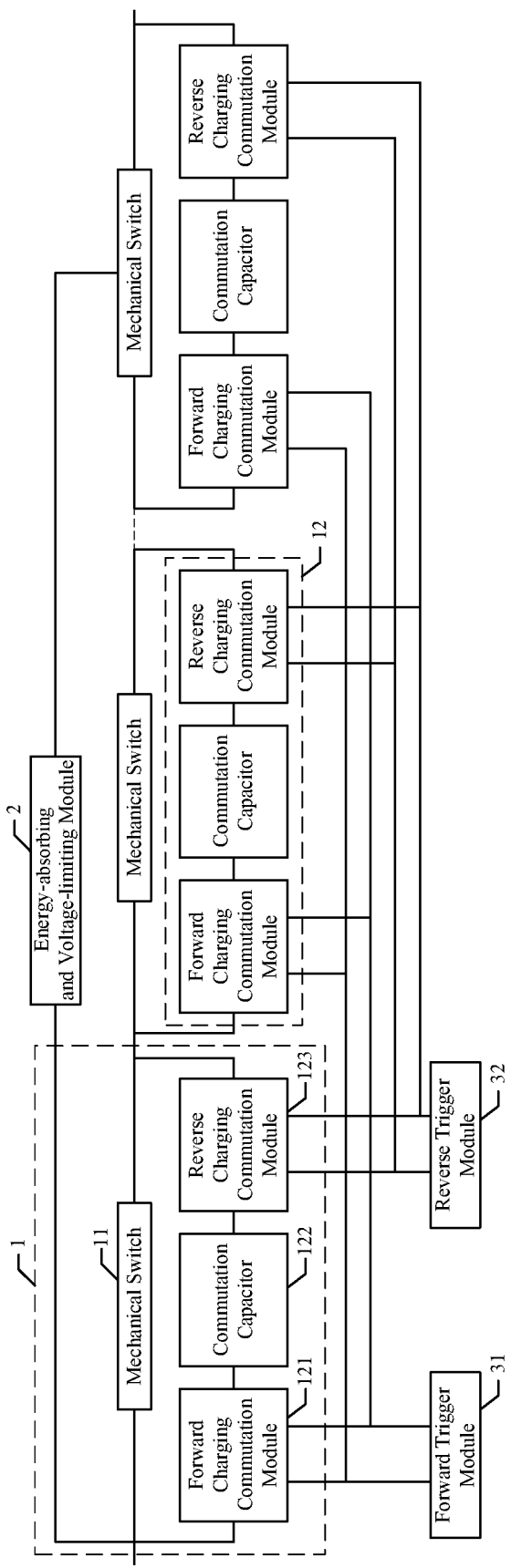
FIG. 6 is a functional block diagram of a high-voltage direct current circuit breaker according to a fifth embodiment of the present disclosure.

FIG. 6 is a functional block diagram of a high-voltage direct current circuit breaker comprising a coupling reactor according to a fifth embodiment of the present disclosure. For better illustration, FIG. 6 only shows the parts related to the embodiment of the present disclosure in detail as follows:

A high-voltage direct current circuit breaker comprising a coupling reactor comprises n in number circuit breaker modules 1 which are connected in series, an energy-absorbing and voltage-limiting module 2 which is connected to circuit breakers in parallel, a forward trigger module 31 and a reverse trigger module 32. n is a positive integer which is greater than or equal to 1. Every circuit breaker module 1 comprises a mechanical switch 11 and a commutation branch circuit 12 which is connected to the mechanical switch 11 in parallel. The commutation branch circuit 12 comprises a forward charging commutation module 121, a commutation capacitor 122 and a reverse charging commutation module 123 which are connected in series in that order. The forward charging commutation module 121 is configured to produce a reverse current in the commutation branch circuit through the coupling reactor to realize the zero-crossing turn-off of the mechanical switch after a forward fault happens. The reverse charging commutation module 123 is configured to produce a reverse current in the commutation branch circuit through the coupling reactor to realize the zero-crossing turn-off of the mechanical switch after a reverse fault happens. The forward trigger module 31 is connected to the forward charging commutation modules 121 of the n in number circuit breaker modules 1 in parallel. The forward trigger module 31 is configured to turn on the forward charging commutation modules 121 when a forward fault happens. The reverse trigger module 32 is connected to the reverse charging commutation modules 123 of the n in number circuit breaker modules 1 in parallel. The reverse trigger module 32 is configured to turn on the reverse charging commutation modules when a reverse fault happens. The energy-absorbing and voltage-limiting module 2 can be a zinc oxide lightning arrester and is configured to absorb the energy stored in inductive elements of power system after a fault current is cut off to realize the voltage-limiting protection of the mechanical switch 11.

The high-voltage direct current circuit breaker comprising a coupling reactor provided by the fifth embodiment of the present disclosure can cut off a heavier current through a multi-module connection. Meanwhile, through the coupling reactor, the primary sides of a plurality of charging commutation modules with the same direction share a trigger switch, and two trigger switches trigger a plurality of charging commutation modules at the same time. Therefore, the present disclosure reduces the amount of trigger switches of multi-module circuit breakers greatly, saves costs and also makes control easier. In addition, the application of the charging commutation module provides a bi-directional turn-off function for circuit breakers.

Figure 7:
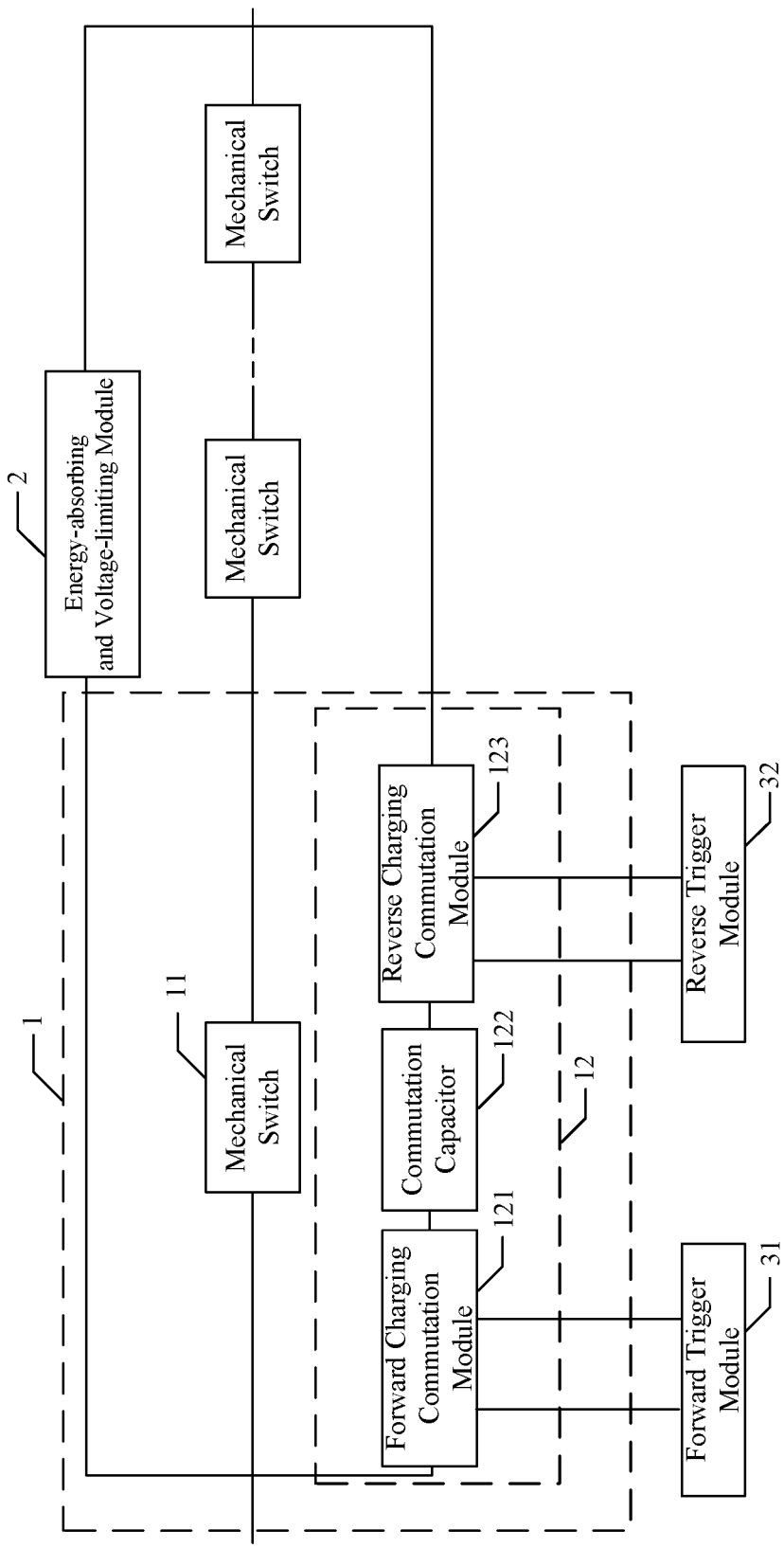
FIG. 7 is a functional block diagram of a high-voltage direct current circuit breaker according to a sixth embodiment of the present disclosure.

FIG. 7 is a functional block diagram of a high-voltage direct current circuit breaker comprising a coupling reactor according to a sixth embodiment of the present disclosure. For better illustration, FIG. 7 only shows the parts related to the embodiment of the present disclosure in detail as follows:

The high-voltage direct current circuit breaker comprising a coupling reactor comprises n in number mechanical switches 11 which are connected in series, an energy-absorbing and voltage-limiting module 2 which is connected to the n in number mechanical switches in parallel, a commutation branch circuit 12 which is connected to the n in number mechanical switches 11 in parallel, a forward trigger module 31 and a reverse trigger module 32. n is a positive integer which is greater than or equal to 1. The commutation branch circuit 12 comprises a forward charging commutation module 121, a commutation capacitor 122 and a reverse charging commutation module 123 which are connected in series in that order. The forward charging commutation module 121 is configured to produce a reverse current in the commutation branch circuit through the coupling reactor to realize the zero-crossing turn-off of the mechanical switch after a forward fault happens. The reverse charging commutation module 123 is configured to produce a reverse current in the commutation branch circuit through the coupling reactor to realize the zero-crossing turn-off of the mechanical switch after a reverse fault happens. The forward trigger module 31 is connected to the forward charging commutation modules 121 in parallel. The forward trigger module 31 is configured to turn on the forward charging commutation module 121 when a forward fault happens. The reverse trigger module 32 is connected to the reverse charging commutation modules 123 in parallel. The reverse trigger module 32 is configured to turn on the reverse charging commutation module when a reverse fault happens. The energy-absorbing and voltage-limiting module 2 can be a zinc oxide lightning arrester and is configured to absorb the energy stored in inductive elements of power system after a fault current is cut off to realize the voltage-limiting protection of the mechanical switch 11.

As for a high-voltage direct current circuit breaker comprising a coupling reactor provided by the sixth embodiment of the present disclosure, a plurality of mechanical switches shares a commutation branch circuit. When the voltage is not very high, the sixth embodiment can reduce the amount of commutation branch circuits and make the circuit structure simpler. In addition, the application of the charging commutation module provides a bi-directional turn-off function for circuit breakers.

Figure 8:
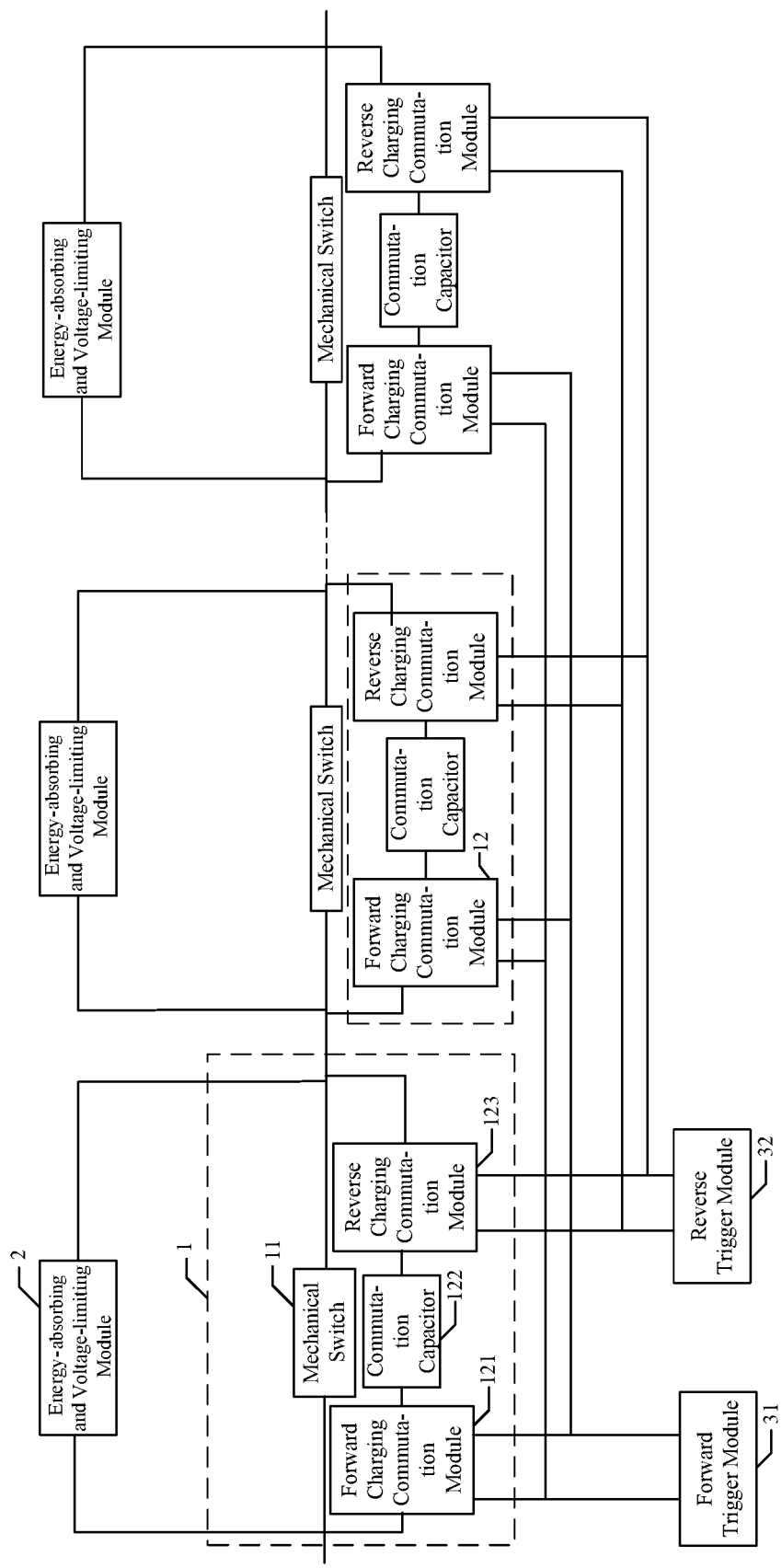
FIG. 8 is a functional block diagram of a high-voltage direct current circuit breaker according to a seventh embodiment of the present disclosure.

FIG. 8 is a functional block diagram of a high-voltage direct current circuit breaker comprising a coupling reactor according to a seventh embodiment of the present disclosure. For better illustration, FIG. 8 only shows the parts related to the embodiment of the present disclosure in detail as follows:

The high-voltage direct current circuit breaker comprising a coupling reactor comprises n in number circuit breaker modules 1 which are connected in series, n energy-absorbing and voltage-limiting modules 2 which are connected to every circuit breaker 1 in parallel, a forward trigger module 31 and a reverse trigger module 32. n is a positive integer which is greater than or equal to 1. Every circuit breaker module 1 comprises a mechanical switch 11 and a commutation branch circuit 12 which is connected to the mechanical switch 11 in parallel. The commutation branch circuit 12 comprises a forward charging commutation module 121, a commutation capacitor 122 and a reverse charging commutation module 123 which are connected in series in that order. The forward charging commutation module 121 is configured to produce a reverse current in the commutation branch circuit through the coupling reactor to realize the zero-crossing turn-off of the mechanical switch after a forward fault happens. The reverse charging commutation module 123 is configured to produce a reverse current in the commutation branch circuit through the coupling reactor to realize the zero-crossing turn-off of the mechanical switch after a reverse fault happens. The forward trigger module 31 is connected to the forward charging commutation modules 121 of the n in number circuit breaker modules 1 in parallel. The forward trigger module 31 is configured to turn on the forward charging commutation module 121 when a forward fault happens. The reverse trigger module 32 is connected to the reverse charging commutation modules 123 of the n in number circuit breaker modules 1 in parallel. The reverse trigger module 32 is configured to turn on the reverse charging commutation module when a reverse fault happens. The energy-absorbing and voltage-limiting module 2 can be a zinc oxide lightning arrester and is configured to absorb the energy stored in inductive elements of power system after a fault current is cut off to realize the voltage-limiting protection of the mechanical switch 11.

The high-voltage direct current circuit breaker comprising a coupling reactor provided by the seventh embodiment of the present disclosure can cut off a heavier current through a multi-module connection. Meanwhile, through the coupling reactor, the primary sides of a plurality of charging commutation modules with the same direction share a trigger switch, and two trigger modules trigger a plurality of charging commutation modules at the same time. Therefore, the present disclosure reduces the amount of trigger switches of multi-module circuit breakers greatly, saves costs and also makes control easier. In addition, the application of the charging commutation module provides a bi-directional turn-off function for circuit breakers.

Figure 9:
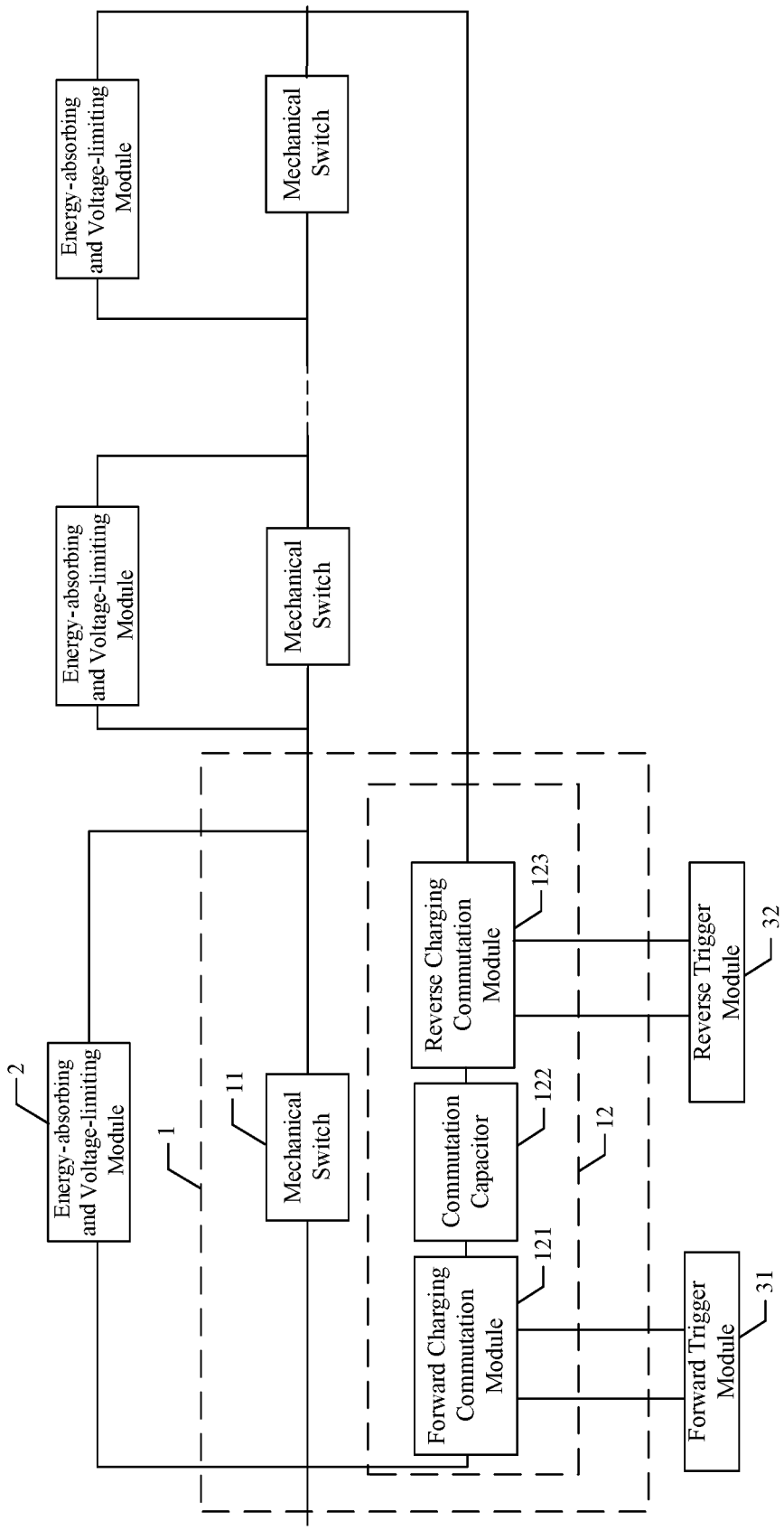
FIG. 9 is a functional block diagram of a high-voltage direct current circuit breaker according to an eighth embodiment of the present disclosure.

FIG. 9 is a functional block diagram of a high-voltage direct current circuit breaker comprising a coupling reactor according to an eighth embodiment of the present disclosure. For better illustration, FIG. 9 only shows the parts related to the embodiment of the present disclosure in detail as follows:

The high-voltage direct current circuit breaker comprising a coupling reactor comprises n in number mechanical switches 11 which are connected in series, n energy-absorbing and voltage-limiting modules which are connected to the mechanical switches in parallel, a commutation branch circuit 12 which is connected to the n in number mechanical switches 11 in parallel, a forward trigger module 31 and a reverse trigger module 32. n is a positive integer which is greater than or equal to 1. The commutation branch circuit 12 comprises a forward charging commutation module 121, a commutation capacitor 122 and a reverse charging commutation module 123 which are connected in series in that order. The forward charging commutation module 121 is configured to produce a reverse current in the commutation branch circuit through the coupling reactor to realize the zero-crossing turn-off of the mechanical switch after a forward fault happens. The reverse charging commutation module 123 is configured to produce a reverse current in the commutation branch circuit through the coupling reactor to realize the zero-crossing turn-off of the mechanical switch after a reverse fault happens. The forward trigger module 31 is connected to the trigger control end of the forward charging commutation modules 121 in parallel. The forward trigger module 31 is configured to turn on the forward charging commutation module 121 when a forward fault happens. The reverse trigger module 32 is connected to the reverse charging commutation modules 123 in parallel. The reverse trigger module 32 is configured to turn on the reverse charging commutation module when a reverse fault happens. The energy-absorbing and voltage-limiting module 2 can be a zinc oxide lightning arrester and is configured to absorb the energy stored in inductive elements of power system after a fault current is cut off to realize the voltage-limiting protection of the mechanical switch 11.

As for the high-voltage direct current circuit breaker comprising a coupling reactor provided by the eighth embodiment of the present disclosure, a plurality of mechanical switches shares a commutation branch circuit. When the voltage is not very high, the sixth embodiment can reduce the amount of commutation branch circuits and make the circuit structure simpler. In addition, the application of the charging commutation module provides a bi-directional turn-off function for circuit breakers.

Figure 10:
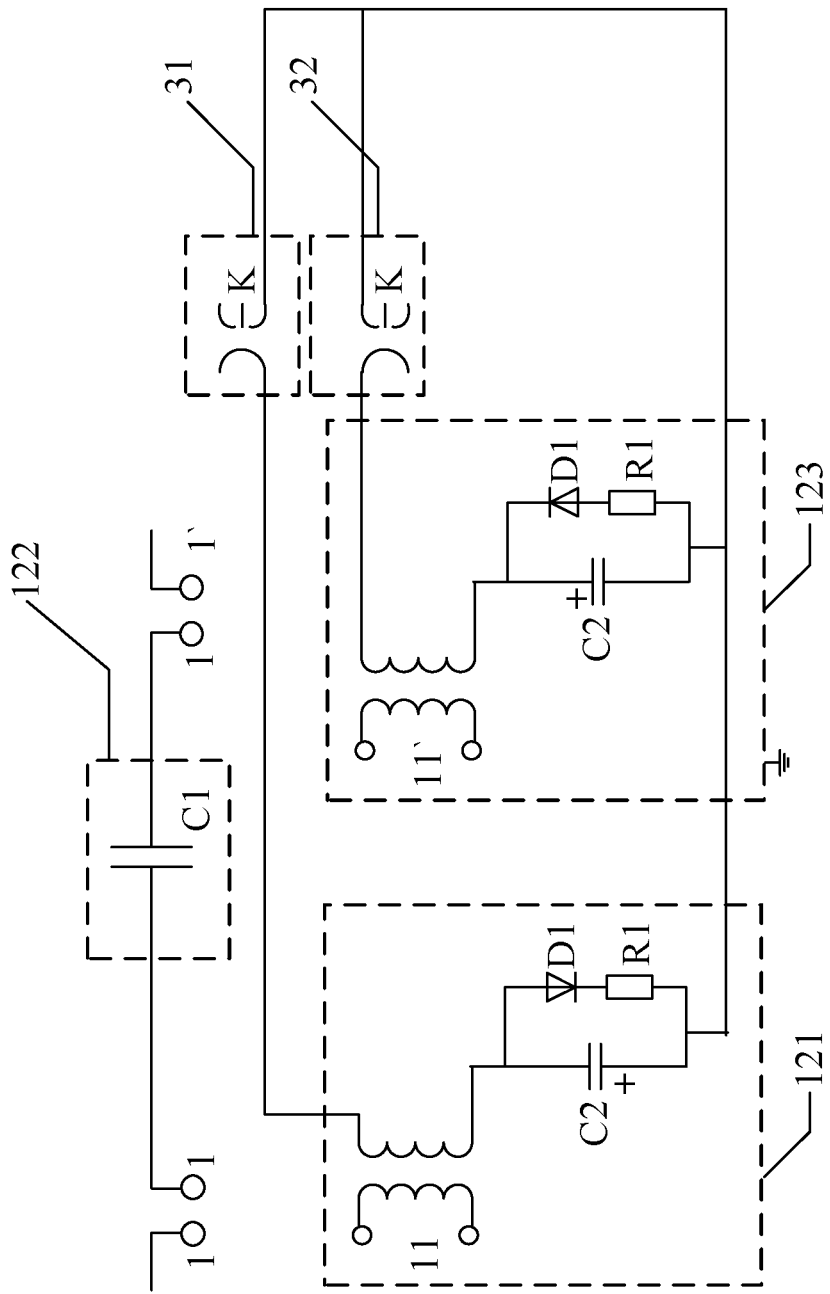
FIG. 10 is a topological structure of a commutation branch circuit and a trigger module of a high-voltage direct current circuit breaker in the eighth embodiment of the present disclosure.

FIG. 10 is a topological structure of the commutation branch circuit and trigger module of a high-voltage direct current circuit breaker comprising a coupling reactor provided by the embodiment of the present disclosure. For better illustration, FIG. 10 only shows the parts related to the first embodiment of the present disclosure in detail as follows:

The forward charging commutation module 121, the commutation capacitor 122, and the reverse charging commutation module 123 are connected in series. The forward charging commutation module 121 comprises a coupling reactor whose secondary side is connected to the commutation capacitor 122, a trigger switch and a reverse pre-charge coupling capacitor which are connected to the secondary side of the coupling reactor in series, and a follow current circuit which is connected to the coupling capacitor in parallel. The forward trigger module 31 is connected to the primary side of the coupling reactor of the forward charging commutation module 121 in parallel. The reverse charging commutation module 123 comprises a coupling reactor whose secondary side is connected to the commutation capacitor in series, a trigger switch and a forward pre-charge coupling capacitor which are connected to the secondary side of the coupling reactor in series, and a follow current circuit which is connected to the coupling capacitor in parallel. The reverse trigger module 32 is connected to the primary side of the coupling reactor of the reverse charging module in parallel. The follow current circuit comprises a resistor and a diode connected in series, and is configured to limit the voltage direction of the two ends of the coupling capacitor.

When a forward fault happens, the line current rises. After certain delay, the mechanical switch is turned off. When the mechanical switch is at an effective open distance, the forward trigger switch is turned on so the coupling capacitor of the forward charging commutation module starts discharging. A reverse current is produced in the commutation branch circuit through the coupling reactor. The reverse current is superimposed on the branch circuit of the mechanical switch to realize voltage zero-crossing of the two ends of the mechanical switch and then the mechanical switch extinguishes arc and is turned off. As the current constantly flows into the commutation branch circuit, the end contact voltage of the mechanical switch constantly rises. When the voltage reaches the operation voltage of the energy-absorbing and voltage-limiting module, the current is transferred to the energy-absorbing and voltage-limiting module to consume the energy stored in the system. Therefore, the complete turn-off of fault is realized.

When a reverse fault happens, the line current rises. After certain delay, the mechanical switch is turned off. When the mechanical switch is at an effective open distance, the reverse trigger switch is turned on so the coupling capacitor of the reverse charging commutation module starts discharging. A reverse current is produced in the commutation branch circuit through the coupling reactor. The reverse current is superimposed on the branch circuit of the mechanical switch to realize voltage zero-crossing of the two ends of the mechanical switch and then the mechanical switch extinguishes arc discharge and is turned off. As the current constantly flows into the commutation branch circuit, the end contact voltage of the mechanical switch constantly rises. When the voltage reaches the operation voltage of the energy-absorbing and voltage-limiting module, the current is transferred to the energy-absorbing and voltage-limiting module to consume the energy stored in the system. Therefore, the complete turn-off of fault is realized.

Figure 11:
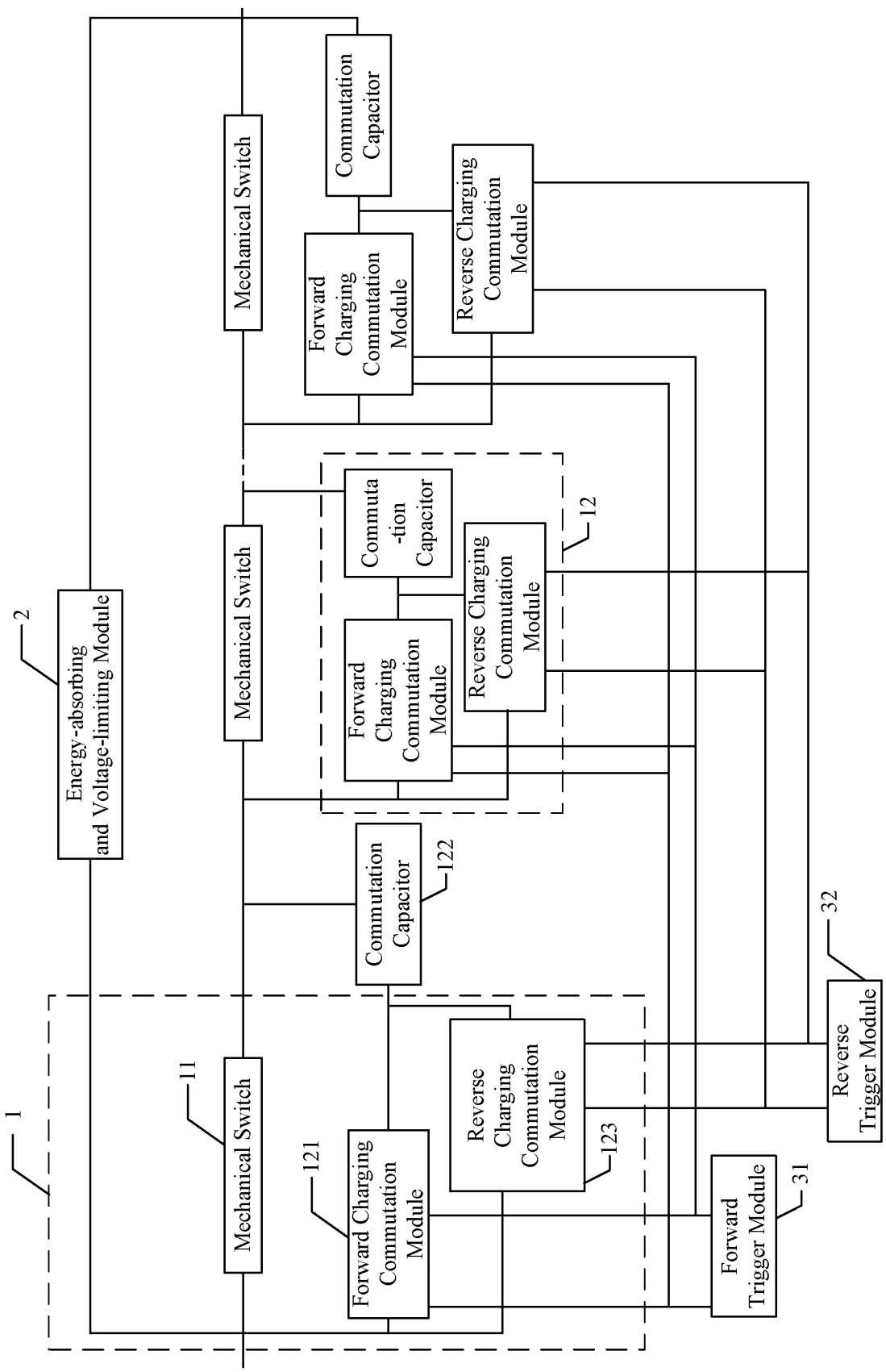
FIG. 11 is a functional block diagram of a high-voltage direct current circuit breaker according to a ninth embodiment of the present disclosure.

FIG. 11 is a functional block diagram of a high-voltage direct current circuit breaker comprising a coupling reactor according to a ninth embodiment of the present disclosure. For better illustration, FIG. 11 only shows the parts related to the embodiment of the present disclosure in detail as follows:

A high-voltage direct current circuit breaker comprising a coupling reactor comprises n in number circuit breaker modules 1 which are connected in series, an energy-absorbing and voltage-limiting module 2 which is connected to all circuit breakers 1 in parallel, a forward trigger module 31 and a reverse trigger module 32. n is a positive integer which is greater than or equal to 1. The circuit breaker module 1 comprises a mechanical switch 11 and a commutation branch circuit 12 which is connected to the mechanical switch 11 in parallel. The commutation branch circuit 12 comprises a forward charging commutation module 121 and a commutation capacitor 122 which are connected in series in that order, and a reverse charging commutation module 123 which is connected to the forward charging commutation module 121 in parallel. The forward charging commutation module 121 is configured to produce a reverse current in the commutation branch circuit through the coupling reactor to realize the zero-crossing turn-off of the mechanical switch after a forward fault happens. The reverse charging commutation module 123 is configured to produce a reverse current in the commutation branch circuit through the coupling reactor to realize the zero-crossing turn-off of the mechanical switch after a reverse fault happens. The forward trigger module 31 is configured to turn on the forward charging commutation module when a forward fault happens. The reverse trigger module 32 is configured to turn on the reverse charging commutation module when a reverse fault happens. The energy-absorbing and voltage-limiting module 2 can be a zinc oxide lightning arrester and is configured to absorb the energy stored in inductive elements of power system after a fault current is cut off to realize the voltage-limiting protection of the mechanical switches 11.

The high-voltage direct current circuit breaker comprising a coupling reactor provided by the ninth embodiment of the present disclosure can cut off a heavier current through a multi-module connection. Meanwhile, through the coupling reactor, the primary sides of a plurality of charging commutation modules with the same direction share a trigger switch, and two trigger switches trigger a plurality of charging commutation modules at the same time. Therefore, the present disclosure reduces the amount of trigger switches of multi-module circuit breakers greatly, saves costs and also makes control easier. In addition, the application of the charging commutation module provides a bi-directional turn-off function for circuit breakers.

Figure 12:
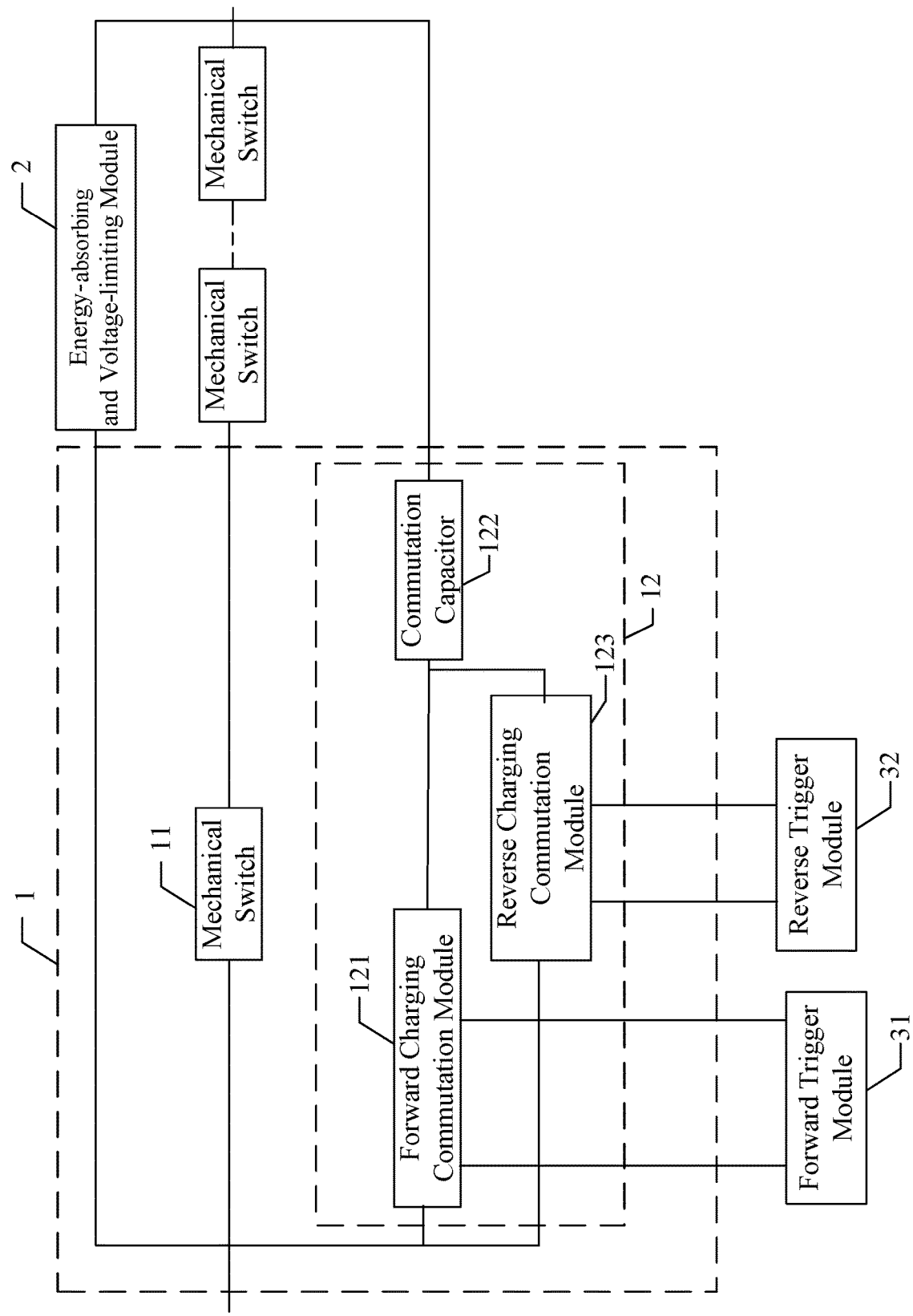
FIG. 12 is a functional block diagram of a high-voltage direct current circuit breaker according to a tenth embodiment of the present disclosure.

FIG. 12 is a functional block diagram of a high-voltage direct current circuit breaker comprising a coupling reactor according to a tenth embodiment of the present disclosure.

For better illustration, FIG. 12 only shows the parts related to the embodiment of the present disclosure in detail as follows:

A high-voltage direct current circuit breaker comprising a coupling reactor comprises n in number mechanical switches 11, an energy-absorbing and voltage-limiting module 2 which is connected to the n in number mechanical switches in parallel, a commutation branch circuit 12 which is connected to the n in number mechanical switches in parallel, a forward trigger module 31 and a reverse trigger module 32. n is a positive integer which is greater than or equal to 1. The commutation branch circuit 12 comprises a forward charging commutation module 121 and a commutation capacitor 122 which are connected in series in that order, and a reverse charging commutation module 123 which is connected to the forward charging commutation module 121 in parallel. The forward charging commutation module 121 is configured to produce a reverse current in the commutation branch circuit through the coupling reactor to realize the zero-crossing turn-off of the mechanical switch after a forward fault happens. The reverse charging commutation module 123 is configured to produce a reverse current in the commutation branch circuit through the coupling reactor to realize the zero-crossing turn-off of the mechanical switch after a reverse fault happens. The forward trigger module 31 is configured to turn on the forward charging commutation module when a forward fault happens. The reverse trigger module 32 is configured to turn on the reverse charging commutation module when a reverse fault happens. The energy-absorbing and voltage-limiting module 2 can be a zinc oxide lightning arrester and is configured to absorb the energy stored in inductive elements of power system after a fault current is cut off to realize the voltage-limiting protection of the mechanical switch 11.

As for a high-voltage direct current circuit breaker comprising a coupling reactor provided by the tenth embodiment of the present disclosure, a plurality of mechanical switches shares a commutation branch circuit. When the voltage is not very high, the sixth embodiment can reduce the amount of commutation branch circuits and make the circuit structure simpler. In addition, the application of the charging commutation module provides a bi-directional turn-off function for circuit breakers.

Figure 13:
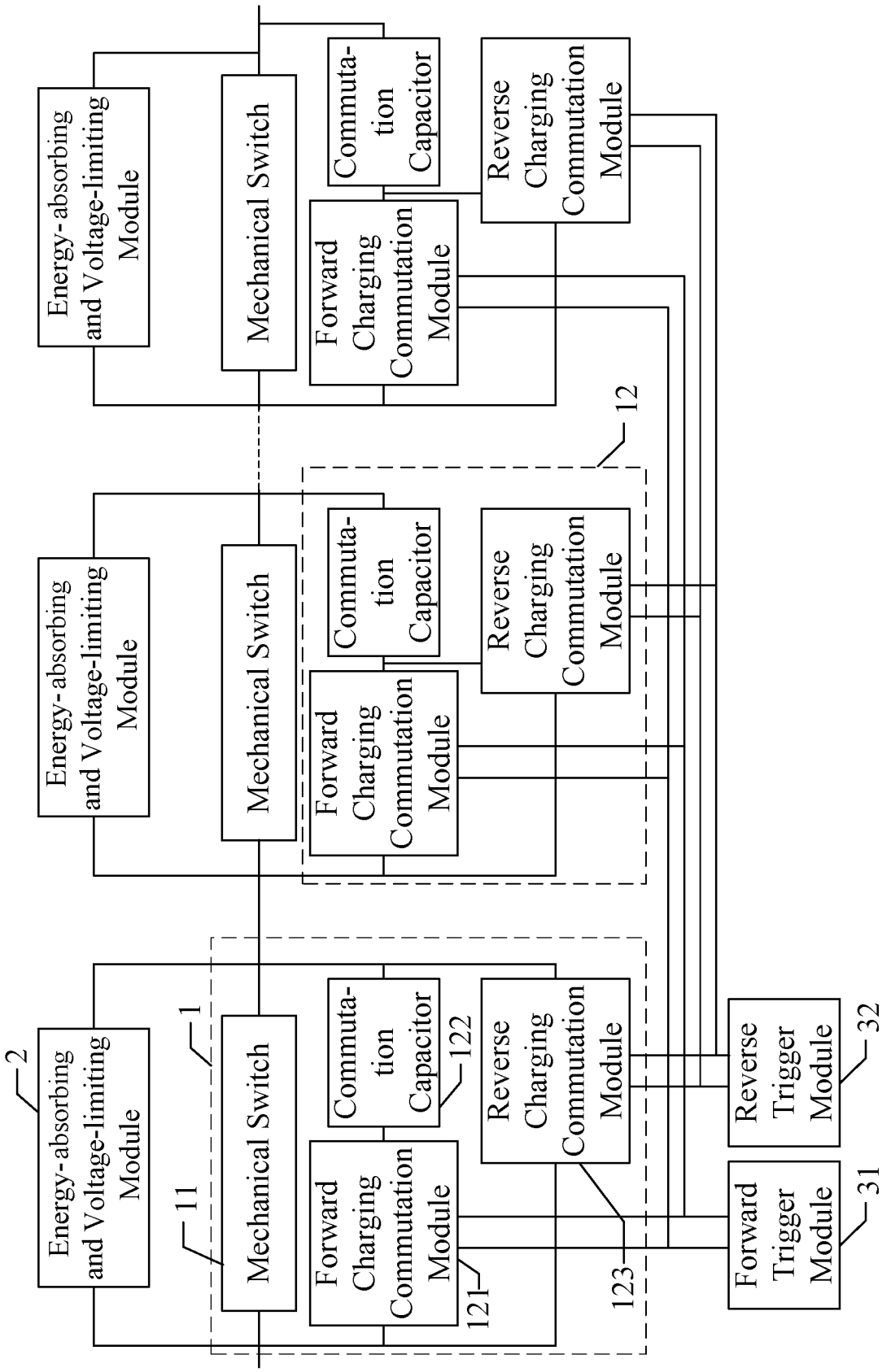
FIG. 13 is a functional block diagram of a high-voltage direct current circuit breaker according to an eleventh embodiment of the present disclosure.

FIG. 13 is a functional block diagram of a high-voltage direct current circuit breaker comprising a coupling reactor according to an eleventh embodiment of the present disclosure. For better illustration, FIG. 13 only shows the parts related to the embodiment of the present disclosure in detail as follows:

A high-voltage direct current circuit breaker comprising a coupling reactor comprises n in number circuit breaker modules 1 which are connected in series, n energy-absorbing and voltage-limiting modules 2 which are connected to every circuit breaker 1 in parallel, a forward trigger module 31 and a reverse trigger module 32. n is a positive integer which is greater than or equal to 1. The circuit breaker module 1 comprises a mechanical switch 11 and a commutation branch circuit 12 which is connected to the mechanical switch 11 in parallel. The commutation branch circuit 12 comprises a forward charging commutation module 121 and a commutation capacitor 122 which are connected in series in that order, and a reverse charging commutation module 123 which is connected to the forward charging commutation module 121 in parallel. The forward charging commutation module 121 is configured to produce a reverse current in the commutation branch circuit through the coupling reactor to realize the zero-crossing turn-off of the mechanical switch after a forward fault happens. The reverse charging commutation module 123 is configured to produce a reverse current in the commutation branch circuit through the coupling reactor to realize the zero-crossing turn-off of the mechanical switch after a reverse fault happens. The forward trigger module 31 is configured to turn on the forward charging commutation module when a forward fault happens. The reverse trigger module 32 is configured to turn on the reverse charging commutation module when a reverse fault happens. The energy-absorbing and voltage-limiting module 2 can be a zinc oxide lightning arrester and is configured to absorb the energy stored in inductive elements of power system after a fault current is cut off to realize the voltage-limiting protection of the mechanical switches 11.

The high-voltage direct current circuit breaker comprising a coupling reactor provided by the eleventh embodiment of the present disclosure can cut off a heavier current through a multi-module connection. Meanwhile, through the coupling reactor, the primary sides of a plurality of charging commutation modules with the same direction share a trigger switch, and two trigger switches trigger a plurality of charging commutation modules at the same time. Therefore, the present disclosure reduces the amount of trigger switches of multi-module circuit breakers greatly, saves costs and also makes control easier. In addition, the application of the charging commutation module provides a bi-directional turn-off function for circuit breakers.

Figure 14:
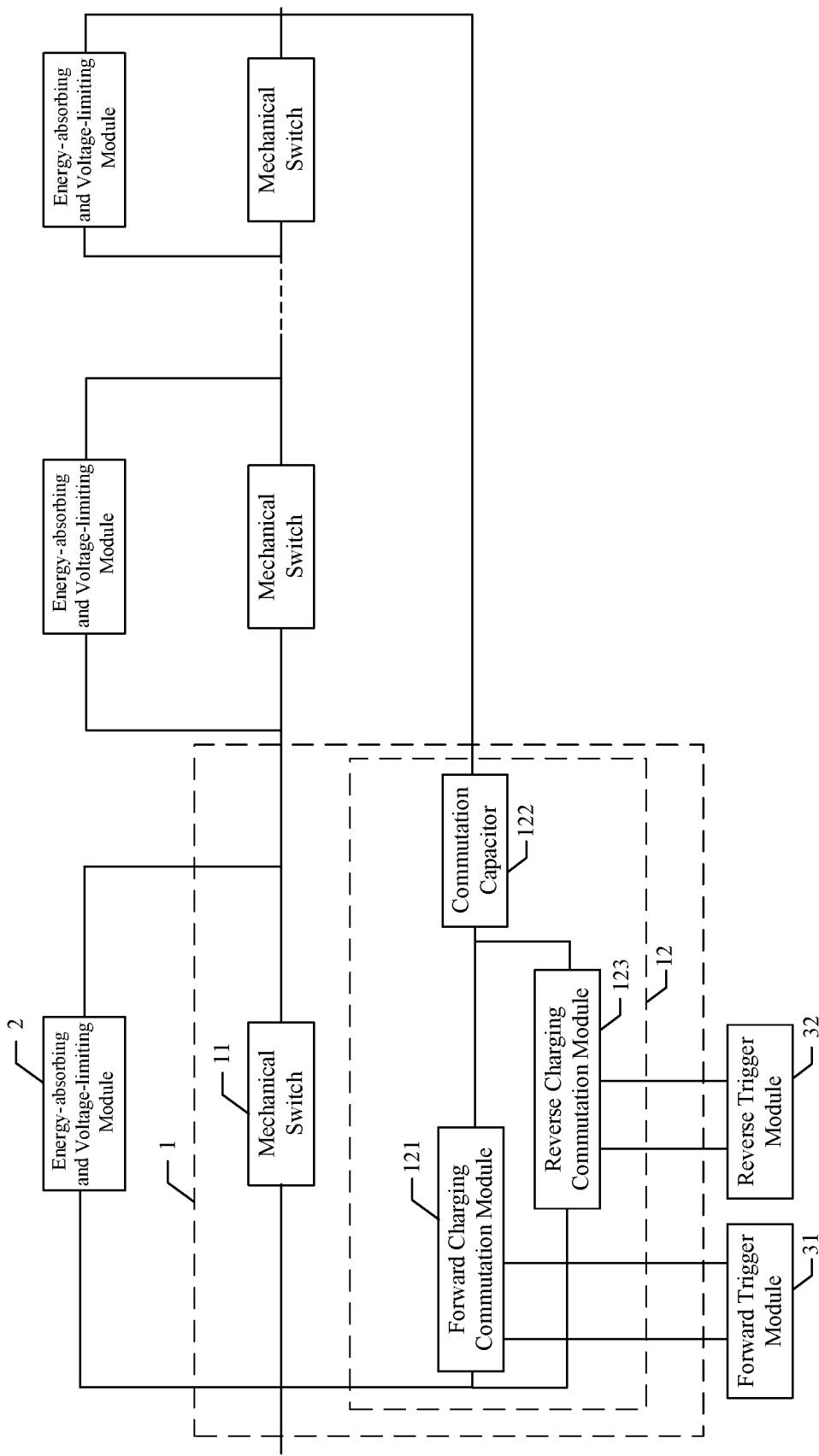
FIG. 14 is a functional block diagram of a high-voltage direct current circuit breaker according to a twelfth embodiment of the present disclosure.

FIG. 14 is a functional block diagram of a high-voltage direct current circuit breaker comprising a coupling reactor according to a twelfth embodiment of the present disclosure. For better illustration, FIG. 14 only shows the parts related to the embodiment of the present disclosure in detail as follows:

A high-voltage direct current circuit breaker comprising a coupling reactor comprises n in number mechanical switches 11, an energy-absorbing and voltage-limiting module 2 which is connected to the n in number mechanical switches in parallel, a commutation branch circuit 12 which is connected to the n in number mechanical switches in parallel, a forward trigger module 31 and a reverse trigger module 32. n is a positive integer which is greater than or equal to 1. The commutation branch circuit 12 comprises a forward charging commutation module 121 and a commutation capacitor 122 which are connected in series in that order, and a reverse charging commutation module 123 which is connected to the forward charging commutation module 121 in parallel. The forward charging commutation module 121 is configured to produce a reverse current in the commutation branch circuit through the coupling reactor to realize the zero-crossing turn-off of the mechanical switch after a forward fault happens. The reverse charging commutation module 123 is configured to produce a reverse current in the commutation branch circuit through the coupling reactor to realize the zero-crossing turn-off of the mechanical switch after a reverse fault happens. The forward trigger module 31 is configured to turn on the forward charging commutation module when a forward fault happens. The reverse trigger module 32 is configured to turn on the reverse charging commutation module when a reverse fault happens. The energy-absorbing and voltage-limiting module 2 can be a zinc oxide lightning arrester and is configured to absorb the energy stored in inductive elements of power system after a fault current is cut off to realize the voltage-limiting protection of the mechanical switches 11.

As for the high-voltage direct current circuit breaker comprising a coupling reactor provided by the twelfth embodiment of the present disclosure, a plurality of mechanical switches shares a commutation branch circuit. When the voltage is not very high, the sixth embodiment can reduce the amount of commutation branch circuits and make the circuit structure simpler. In addition, the application of the charging commutation module provides a bi-directional turn-off function for circuit breakers.

Figure 15:
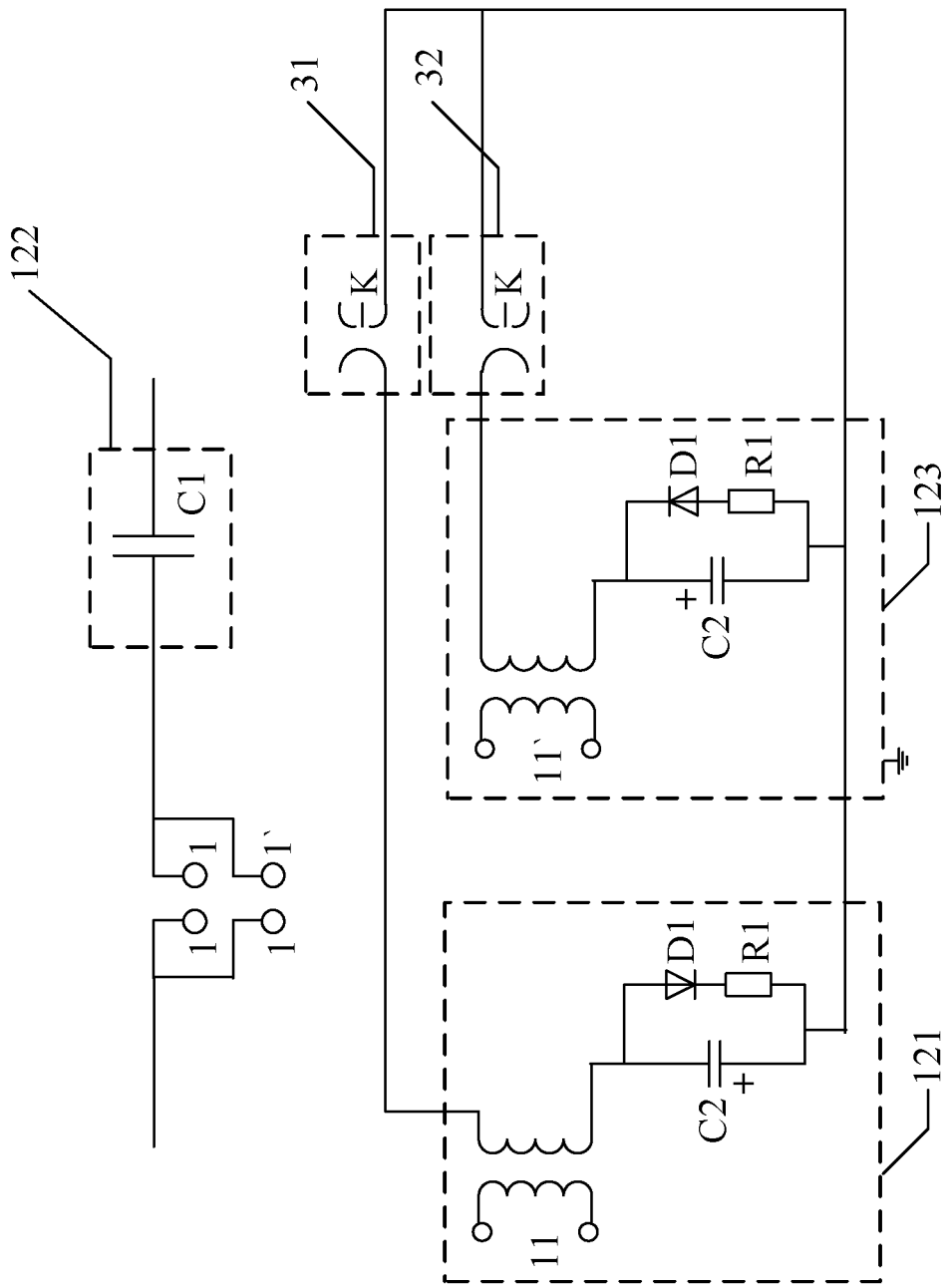
FIG. 15 is a topological structure of a commutation branch circuit and a trigger module of a high-voltage direct current circuit breaker in the twelfth embodiment of the present disclosure.

FIG. 15 is a topological structure of a commutation branch circuit and a trigger module of a high-voltage direct current circuit breaker comprising a coupling reactor provided by the embodiment of the present disclosure. For better illustration, FIG. 15 only shows the parts related to the embodiment of the present disclosure in detail as follows:

The forward charging commutation module 121 is connected to the reverse charging commutation module 123 in parallel and then with the commutation capacitor 122 in series. The forward charging commutation module comprises a coupling reactor whose secondary side is connected to the commutation capacitor, a trigger switch and a reverse pre-charged coupling capacitor which are connected to the secondary side of the coupling reactor in series, and a follow current circuit which is connected to the coupling capacitor in parallel. The forward trigger module 31 is connected to the primary side of the coupling reactor of the forward charging commutation module in parallel. The reverse charging commutation module comprises a coupling reactor whose secondary side is connected to the commutation capacitor in series, a trigger switch and a forward pre-charge coupling capacitor which are connected to the secondary side of the coupling reactor in series, and a follow current circuit which is connected to the coupling capacitor in parallel. The reverse trigger module 32 is connected to the primary side of the coupling reactor of the reverse charging module in parallel. The follow current circuit comprises a resistor and a diode connected in series, and is configured to limit the voltage direction of the two ends of the coupling capacitor.

When a forward fault happens, the line current rises. After certain delay, the mechanical switch is turned off. When the mechanical switch is at an effective open distance, the forward trigger module is turned on so the coupling capacitor of the forward charging commutation module starts discharging. A reverse current is produced in the commutation branch circuit through the coupling reactor. The reverse current is superimposed on the branch circuit of the mechanical switch to realize voltage zero-crossing of the two ends of the mechanical switch and then the mechanical switch extinguishes arc and is turned off. As the current constantly flows into the commutation branch circuit, the end contact voltage of the mechanical switch constantly rises. When the voltage reaches the operation voltage of the energy-absorbing and voltage-limiting module, the current is transferred to the energy-absorbing and voltage-limiting module to consume the energy stored in the system. Therefore, the complete turn-off of fault is realized.

When a reverse fault happens, the line current rises. After certain delay, the mechanical switch is turned off. When the mechanical switch is at an effective open distance, the reverse trigger module is turned on so the coupling capacitor of the reverse charging commutation module starts discharging. A reverse current is produced in the commutation branch circuit through the coupling reactor. The reverse current is superimposed on the branch circuit of the mechanical switch to realize voltage zero-crossing of the two ends of the mechanical switch and then the mechanical switch extinguishes arc and is turned off. As the current constantly flows into the commutation branch circuit, the end contact voltage of the mechanical switch constantly rises. When the voltage reaches the operation voltage of the energy-absorbing and voltage-limiting module, the current is transferred to the energy-absorbing and voltage-limiting module to consume the energy stored in the system. Therefore, the complete turn-off of fault is realized.

Figure 16:
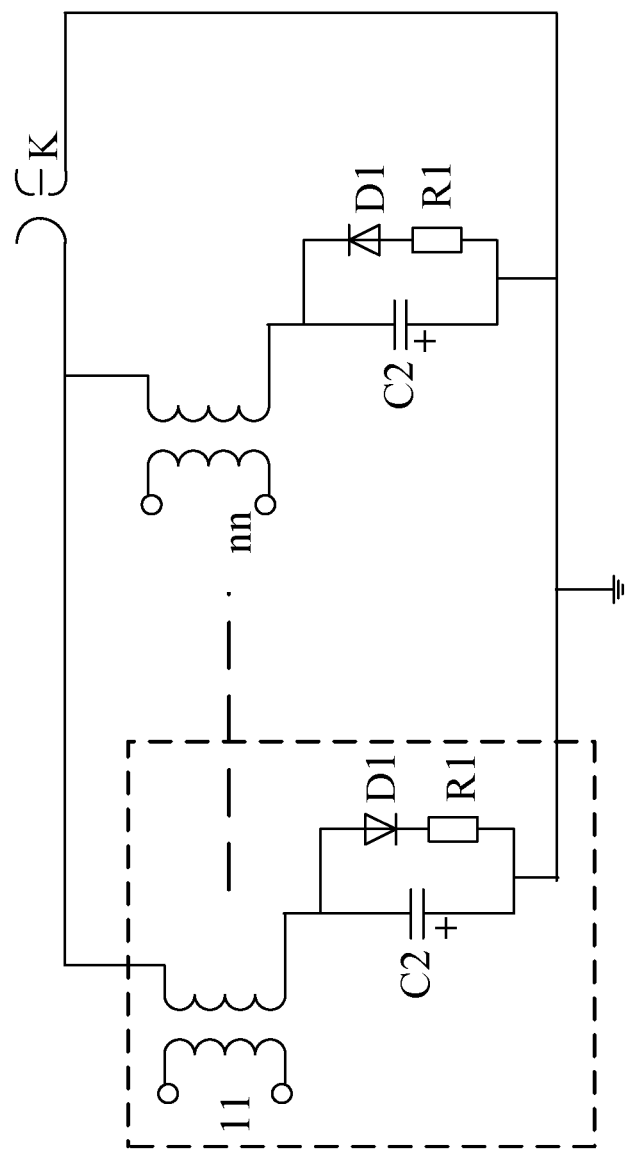
FIG. 16 is another topological structure of a commutation branch circuit and a trigger module of a high-voltage direct current circuit breaker in the twelfth embodiment of the present disclosure.

FIG. 16 is another topological structure of commutation branches circuit and a trigger module of a high-voltage direct current circuit breaker comprising a coupling reactor provided by the embodiment of the present disclosure. For better illustration, FIG. 16 only shows the parts related to the embodiment of the present disclosure in detail as follows:

The primary side of the charging commutation module and the trigger switch topology when a high-voltage direct current circuit breaker comprising a coupling reactor provided embodiment of the present disclosure provides has a multi-module connection. When the circuit breaker comprises a plurality of mechanical switches in cascade, the primary sides of the charging commutation modules with the same direction are connected to each other in parallel and then with the trigger module in series. A trigger module triggers a plurality of charging commutation modules with the same direction at the same time to greatly reduce the amount of the trigger modules in the multi-module circuit breaker.

Figure 17:
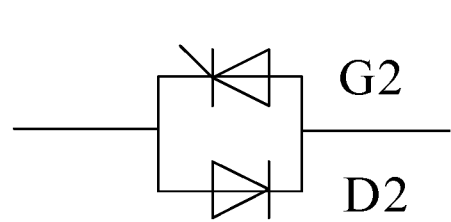
FIG. 17 is a topological structure of a trigger module comprising a thyristor and a diode in antiparallel of a high-voltage direct current circuit breaker in accordance to one embodiment of the present disclosure.

FIG. 17 is a topological structure of a trigger module comprising antiparallel thyristor and diode of a high-voltage direct current circuit breaker in accordance to one embodiment of the present disclosure. For better illustration, FIG. 17 only shows the parts related to the embodiment of the present disclosure in detail as follows:

The trigger module of the high-voltage direct current circuit breaker of the present embodiment is a topological structure of a thyristor and a diode which are in antiparallel. When a fault happens, the thyristor is always on, the communication branch circuit constantly oscillates at high amplitude and produces multiple zero crossing points, so that the high-voltage direct current circuit breaker can reliably interrupt the forward current, reverse current and rated current. In addition, the trigger module is located in the low-voltage return circuit, so it only involves a small number of anti-paralleled thyristors and diodes, the cost is low, and no heat dissipation system is required.

Figure 18:
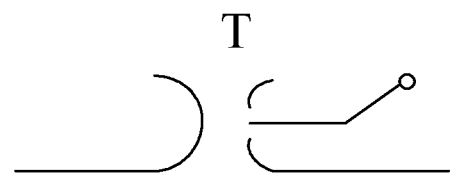
FIG. 18 is a topological structure of a trigger module comprising a trigger switch of a high-voltage direct current circuit breaker in accordance to one embodiment of the present disclosure.

FIG. 18 is a topological structure of a trigger module comprising a trigger switch of a high-voltage direct current circuit breaker comprising a coupling reactor provided by the embodiment of the present disclosure. For better illustration, FIG. 18 only shows the parts related to the embodiment of the present disclosure in detail as follows:

The trigger module of the high-voltage direct current circuit breaker of the present embodiment is a topological structure of a trigger switch. When a fault happens, the trigger switch is triggered on, the communication branch circuit constantly oscillates at high amplitude and produces multiple zero crossing points, so that the high-voltage direct current circuit breaker can reliably interrupt the forward current, reverse current and rated current. In addition, the trigger module is located in the low-voltage return circuit, so it only involves a small number of trigger switches, thus having high conductivity reliability.

The direct current circuit breaker isolates the charging loop through the coupling reactor, reduces the amount of trigger modules, greatly lowers costs, and makes the control of the direct current circuit breaker simpler and the circuit structure easier. In addition, the charging commutation module of the circuit breaker provides a function of bi-directional fault turn-off.

It will be obvious to those skilled in the art that the foregoing embodiments are only better embodiments of the present disclosure, and are not for the purpose of limiting the present disclosure. Any modifications, alternations and improvements without departing from the spirit and scope of the present disclosure shall all be included in the protection scope of the present disclosure.

The invention claimed is:

1. A direct current circuit breaker, comprising:
n in number circuit breaker modules connected in series;
one energy-absorbing and voltage-limiting module connected in parallel to the n in number circuit breaker modules; and
a trigger module;
wherein
the n in number circuit breaker modules each comprise a mechanical switch and a commutation branch circuit which are connected in parallel;
each commutation branch circuit comprises a charging commutation module and a commutation capacitor which are connected in series;
the charging commutation module is configured to charge up the commutation capacitor and produce reverse current to cut off the mechanical switch;
the one energy-absorbing and voltage-limiting module is configured to absorb energy stored in inductive elements of power systems after a fault current is cut off, so as to limit voltage and protect the mechanical switch;
the trigger module is connected in parallel to n in number charging commutation modules, and is configured to trigger and turn on the n in number charging commutation modules after faults; and
n is a positive integer greater than or equal to 1.

2. A direct current circuit breaker, comprising:
n in number mechanical switches connected in series;
one energy-absorbing and voltage-limiting module connected in parallel to the n in number mechanical switches;
a trigger module; and
one commutation branch circuit connected in parallel to the n in number mechanical switches;
wherein
the one commutation branch circuit comprises a charging commutation module and a commutation capacitor which are connected in series;
the charging commutation module is configured to charge up the commutation capacitor and produce reverse current to cut off the n in number mechanical switches;
the one energy-absorbing and voltage-limiting module is configured to absorb energy stored in inductive elements of power systems after a fault current is cut off, so as to limit voltage and protect the mechanical switches;
the trigger module is connected in parallel to the one charging commutation module, and is configured to trigger and turn on the one charging commutation module after faults; and
n is a positive integer greater than or equal to 1.

3. A direct current circuit breaker, comprising:
n in number circuit breaker modules connected in series;
n in number energy-absorbing and voltage-limiting modules connected in parallel to the n in number circuit breaker modules, respectively; and
a trigger module;
wherein
the n in number circuit breaker modules each comprise a mechanical switch and a commutation branch circuit which are connected in parallel;
each commutation branch circuit comprises a charging commutation module and a commutation capacitor which are connected in series;
the charging commutation module is configured to charge up the commutation capacitor and produce reverse current to cut off the mechanical switch;
the n in number energy-absorbing and voltage-limiting modules are configured to absorb energy stored in inductive elements of power systems after a fault current is cut off, so as to limit voltage and protect the mechanical switch;
the trigger module is connected in parallel to n in number charging commutation modules, and is configured to trigger and turn on the n in number charging commutation modules after faults; and
n is a positive integer greater than or equal to 1.

4. A direct current circuit breaker, comprising:
n in number mechanical switches connected in series;
n in number energy-absorbing and voltage-limiting modules connected in parallel to the n in number mechanical switches, respectively;
a trigger module; and
one commutation branch circuit connected in parallel to the n in number mechanical switches;
wherein
the one commutation branch circuit comprises a charging commutation module and a commutation capacitor which are connected in series;
the charging commutation module is configured to charge up the commutation capacitor and produce reverse current to cut off the mechanical switches;
the n in number energy-absorbing and voltage-limiting modules are configured to absorb energy stored in inductive elements of power systems after a fault current is cut off, so as to limit voltage and protect the mechanical switches;
the trigger module is connected in parallel to the charging commutation module, and is configured to trigger and turn on the charging commutation module after faults; and
n is a positive integer greater than or equal to 1.

5. The direct current circuit breaker of claim 1, wherein:
the charging commutation module comprises a coupling reactor, a coupling capacitor which is connected in series to one end of a primary side of the coupling reactor, and a follow current circuit which is connected in parallel to the coupling capacitor; and
a secondary side of the coupling reactor is connected in series to the commutation capacitor, and the other end of the primary side of the coupling reactor is connected in parallel to the trigger module.

6. The direct current circuit breaker of claim 4, wherein:
the charging commutation module comprises a coupling reactor, a coupling capacitor which is connected in series to one end of a primary side of the coupling reactor, and a follow current circuit which is connected in parallel to the coupling capacitor; and
a secondary side of the coupling reactor is connected in series to the commutation capacitor, and the other end of the primary side of the coupling reactor is connected in parallel to the trigger module.

7. The direct current circuit breaker of claim 5, wherein the follow current circuit comprises a resistor and a diode which are connected in series.

8. The direct current circuit breaker of claim 6, wherein the follow current circuit comprises a resistor and a diode which are connected in series.

9. A direct current circuit breaker, comprising:
n in number circuit breaker modules connected in series;
one energy-absorbing and voltage-limiting module which is connected in parallel to the n in number circuit breaker modules;
one forward trigger module; and
one reverse trigger module;
wherein
each circuit breaker module comprises a mechanical switch and a commutation branch circuit which is connected in parallel to the mechanical switch;
the commutation branch circuit comprises a forward charging commutation module, a commutation capacitor, and a reverse charging commutation module which are connected in series in that order;
the forward charging commutation module is configured to produce a reverse current in the commutation branch circuit through the coupling reactor to realize the zero-crossing turn-off of the mechanical switch after a forward fault happens;
the reverse charging commutation module is configured to produce a reverse current in the commutation branch circuit through the coupling reactor to realize the zero-crossing turn-off of the mechanical switch after a reverse fault happens;
the one energy-absorbing and voltage-limiting module is configured to absorb energy stored in inductive elements of power systems after a fault current is cut off, so as to limit voltage and protect the mechanical switch;
the forward trigger module is connected in parallel to forward charging commutation modules of the n in number circuit breaker modules and is configured to turn on the forward charging commutation modules when a forward fault happens;
the reverse trigger module is connected in parallel to reverse charging commutation modules of the n in number circuit breaker modules and is configured to turn on the reverse charging commutation modules when a reverse fault happens; and
n is a positive integer which is greater than or equal to 1.

10. A direct current circuit breaker, comprising:
n in number mechanical switches connected in series;
one energy-absorbing and voltage-limiting module which is connected in parallel to the n in number mechanical switches;
one commutation branch circuit which is connected in parallel to the n in number mechanical switches;
one forward trigger module; and
one reverse trigger module;
wherein
the one commutation branch circuit comprises a forward charging commutation module, a commutation capacitor, and a reverse charging commutation module which are connected in series in that order;
the forward charging commutation module is configured to produce a reverse current in the commutation branch circuit through the coupling reactor to realize the zero-crossing turn-off of the mechanical switch after a forward fault happens;
the reverse charging commutation module is configured to produce a reverse current in the commutation branch circuit through the coupling reactor to realize the zero-crossing turn-off of the mechanical switch after a reverse fault happens;
the one energy-absorbing and voltage-limiting module is configured to absorb energy stored in inductive elements of power systems after a fault current is cut off, so as to limit voltage and protect the mechanical switch;
the forward trigger module is connected in parallel to forward charging commutation modules of the n in number circuit breaker modules and is configured to turn on the forward charging commutation modules when a forward fault happens;
the reverse trigger module is connected in parallel to reverse charging commutation modules of the n in number circuit breaker modules and is configured to turn on the reverse charging commutation modules when a reverse fault happens; and
n is a positive integer which is greater than or equal to 1.

11. A direct current circuit breaker, comprising:
n in number circuit breaker modules connected in series;
n in number energy-absorbing and voltage-limiting modules which are connected to the n in number circuit breaker modules in parallel, respectively;
one forward trigger module; and
one reverse trigger module;
wherein
each circuit breaker module comprises a mechanical switch and a commutation branch circuit which is connected to the mechanical switch in parallel;
the commutation branch circuit comprises a forward charging commutation module, a commutation capacitor, and a reverse charging commutation module which are connected in series in that order;
the forward charging commutation module is configured to produce a reverse current in the commutation branch circuit through the coupling reactor to realize the zero-crossing turn-off of the mechanical switch after a forward fault happens;
the reverse charging commutation module is configured to produce a reverse current in the commutation branch circuit through the coupling reactor to realize the zero-crossing turn-off of the mechanical switch after a reverse fault happens;
the one energy-absorbing and voltage-limiting module is configured to absorb energy stored in inductive elements of power systems after a fault current is cut off, so as to limit voltage and protect the mechanical switch;
the forward trigger module is connected to forward charging commutation modules of the n in number circuit breaker modules in parallel and is configured to turn on the forward charging commutation modules when a forward fault happens;
the reverse trigger module is connected to reverse charging commutation modules of the n in number circuit breaker modules in parallel and is configured to turn on the reverse charging commutation modules when a reverse fault happens; and
n is a positive integer which is greater than or equal to 1.

12. A direct current circuit breaker, comprising:
n in number mechanical switches connected in series;
n in number energy-absorbing and voltage-limiting modules which are connected in parallel to the n in number mechanical switches, respectively;
one commutation branch circuit which is connected in parallel to the n in number mechanical switches;

one forward trigger module; and
one reverse trigger module;
wherein
the one commutation branch circuit comprises a forward charging commutation module, a commutation capacitor, and a reverse charging commutation module which are connected in series in that order;
the forward charging commutation module is configured to produce a reverse current in the commutation branch circuit through the coupling reactor to realize the zero-crossing turn-off of the mechanical switch after a forward fault happens;
the reverse charging commutation module is configured to produce a reverse current in the commutation branch circuit through the coupling reactor to realize the zero-crossing turn-off of the mechanical switch after a reverse fault happens;
the one energy-absorbing and voltage-limiting module is configured to absorb energy stored in inductive elements of power systems after a fault current is cut off, so as to limit voltage and protect the mechanical switch;
the forward trigger module is connected to forward charging commutation modules of the n in number circuit breaker modules in parallel and is configured to turn on the forward charging commutation modules when a forward fault happens;
the reverse trigger module is connected to reverse charging commutation modules of the n in number circuit breaker modules in parallel and is configured to turn on the reverse charging commutation modules when a reverse fault happens; and
n is a positive integer which is greater than or equal to 1.

13. A direct current circuit breaker, comprising:
n in number circuit breaker modules connected in series;
one energy-absorbing and voltage-limiting module which is connected in parallel to the n in number circuit breaker modules;
one forward trigger module; and
one reverse trigger module;
wherein
each circuit breaker module comprises a mechanical switch and a commutation branch circuit which is connected in parallel to the mechanical switch;
the commutation branch circuit comprises a forward charging commutation module and a commutation capacitor which are connected in series, and a reverse charging commutation module which is connected in parallel to the forward charging commutation module;
the forward charging commutation module is configured to produce a reverse current in the commutation branch circuit through the coupling reactor to realize the zero-crossing turn-off of the mechanical switch after a forward fault happens;
the reverse charging commutation module is configured to produce a reverse current in the commutation branch circuit through the coupling reactor to realize the zero-crossing turn-off of the mechanical switch after a reverse fault happens;
the one energy-absorbing and voltage-limiting module is configured to absorb energy stored in inductive elements of power systems after a fault current is cut off, so as to limit voltage and protect the mechanical switch;
the forward trigger module is configured to turn on the forward charging commutation module when a forward fault happens;
the reverse trigger module is configured to turn on the reverse charging commutation module when a reverse fault happens; and
n is a positive integer which is greater than or equal to 1.

14. A direct current circuit breaker, comprising:
n in number mechanical switches connected in series;
one energy-absorbing and voltage-limiting module which is connected in parallel to the n in number mechanical switches;
one commutation branch circuit which is connected in parallel to the n in number mechanical switches;
one forward trigger module; and
one reverse trigger module;
wherein
the one commutation branch circuit comprises a forward charging commutation module and a commutation capacitor which are connected in series, and a reverse charging commutation module which is connected in parallel to the forward charging commutation module;
the forward charging commutation module is configured to produce a reverse current in the commutation branch circuit through the coupling reactor to realize the zero-crossing turn-off of the mechanical switch after a forward fault happens;
the reverse charging commutation module is configured to produce a reverse current in the commutation branch circuit through the coupling reactor to realize the zero-crossing turn-off of the mechanical switch after a reverse fault happens;
the one energy-absorbing and voltage-limiting module is configured to absorb energy stored in inductive elements of power systems after a fault current is cut off, so as to limit voltage and protect the mechanical switch;
the forward trigger module is configured to turn on the forward charging commutation module when a forward fault happens;
the reverse trigger module is configured to turn on the reverse charging commutation module when a reverse fault happens; and
n is a positive integer which is greater than or equal to 1.

15. A direct current circuit breaker, comprising:
n in number circuit breaker modules connected in series;
n in number energy-absorbing and voltage-limiting modules which are connected in parallel to the n in number circuit breaker modules, respectively;
one forward trigger module; and
one reverse trigger module;
wherein
each circuit breaker module comprises a mechanical switch and a commutation branch circuit which is connected in parallel to the mechanical switch;
the commutation branch circuit comprises a forward charging commutation module and a commutation capacitor which are connected in series, and a reverse charging commutation module which is connected in parallel to the forward charging commutation module;
the forward charging commutation module is configured to produce a reverse current in the commutation branch circuit through the coupling reactor to realize the zero-crossing turn-off of the mechanical switch after a forward fault happens;
the reverse charging commutation module is configured to produce a reverse current in the commutation branch circuit through the coupling reactor to realize the zero-crossing turn-off of the mechanical switch after a reverse fault happens;

the n in number energy-absorbing and voltage-limiting modules are configured to absorb energy stored in inductive elements of power systems after a fault current is cut off, so as to limit voltage and protect the mechanical switch;

the forward trigger module is configured to turn on the forward charging commutation module when a forward fault happens;

the reverse trigger module is configured to turn on the reverse charging commutation module when a reverse fault happens; and n is a positive integer which is greater than or equal to 1.

16. A direct current circuit breaker, comprising:

n in number mechanical switches connected in series;

n in number energy-absorbing and voltage-limiting modules which are connected to the n in number mechanical switches in parallel, respectively;

one commutation branch circuit which is connected in parallel to the n in number mechanical switches;

one forward trigger module; and one reverse trigger module;

wherein the commutation branch circuit comprises a forward charging commutation module a commutation capacitor which are connected in series, and a reverse charging commutation module which are connected in parallel to the forward charging commutation module;

the forward charging commutation module is configured to produce a reverse current in the commutation branch circuit through the coupling reactor to realize the zero-crossing turn-off of the mechanical switch after a forward fault happens;

the reverse charging commutation module is configured to produce a reverse current in the commutation branch circuit through the coupling reactor to realize the zero-crossing turn-off of the mechanical switch after a reverse fault happens;

the n in number energy-absorbing and voltage-limiting modules are configured to absorb energy stored in inductive elements of power systems after a fault current is cut off, so as to limit voltage and protect the mechanical switch;

the forward trigger module is configured to turn on the forward charging commutation module when a forward fault happens;

the reverse trigger module is configured to turn on the reverse charging commutation module when a reverse fault happens; and n is a positive integer which is greater than or equal to 1.

17. The direct current circuit breaker of claim 16, wherein the forward charging commutation module comprises a coupling reactor, a coupling capacitor, and a follow current circuit which is connected in parallel to the coupling capacitor;

a secondary side of the coupling reactor is connected in series to the commutation capacitor; one end of the primary side of the coupling reactor is grounded through the coupling capacitor, and the other end of the primary side of the coupling reactor is connected to the forward trigger module; and the follow current circuit comprises a diode and a resistor which are connected in series; an anode of the diode is connected to the coupling capacitor, and a cathode of the diode is connected in series to the resistor.

18. The direct current circuit breaker of claim 16, wherein the reverse charging commutation module comprises a reactor, a coupling capacitor, and a follow current circuit which is connected in parallel to the coupling capacitor;

the secondary side of the coupling reactor is connected in series to the commutation capacitor; one end of the primary side of the coupling reactor is grounded through the coupling capacitor, and the other end of the primary side of the coupling reactor is connected to the reverse trigger module; and the follow current circuit comprises a diode and a resistor which are connected in series; an anode of the diode is connected to the coupling capacitor, and a cathode of the diode is connected in series to the resistor.

19. The direct current circuit breaker of claim 17, wherein the trigger module, the forward trigger module, or the reverse trigger module comprises a thyristor and a diode which are connected in parallel.

20. The direct current circuit breaker of claim 18, wherein the trigger module, the forward trigger module, or the reverse trigger module comprises a trigger switch.

* * * * *